US008799565B2

(12) United States Patent
Ikarashi

(10) Patent No.: US 8,799,565 B2
(45) Date of Patent: Aug. 5, 2014

(54) MEMORY CONTROLLING DEVICE

(75) Inventor: Takahiro Ikarashi, Tokyo (JP)

(73) Assignee: Sony Corporation, Tokyo (JP)

( * ) Notice: Subject to any disclaimer, the term of this patent is extended or adjusted under 35 U.S.C. 154(b) by 809 days.

(21) Appl. No.: 12/656,045

(22) Filed: Jan. 14, 2010

(65) Prior Publication Data

US 2010/0250841 A1    Sep. 30, 2010

(30) Foreign Application Priority Data

Mar. 27, 2009   (JP) .................................. 2009-078275

(51) Int. Cl.
*G11C 8/18* (2006.01)
*G06F 13/00* (2006.01)

(52) U.S. Cl.
USPC ............................ 711/105; 711/167; 713/400

(58) Field of Classification Search
None
See application file for complete search history.

(56) References Cited

U.S. PATENT DOCUMENTS

| | | | | |
|---|---|---|---|---|
| 6,128,716 | A | * | 10/2000 | Biggs ............................ 711/169 |
| 2002/0065981 | A1 | * | 5/2002 | Jenne et al. .................... 711/105 |
| 2002/0138687 | A1 | * | 9/2002 | Yang et al. ..................... 711/105 |
| 2002/0194444 | A1 | * | 12/2002 | Goodrich et al. .............. 711/167 |
| 2002/0194448 | A1 | * | 12/2002 | Yu .................................. 711/173 |
| 2005/0268024 | A1 | * | 12/2005 | Seo et al. ........................... 711/5 |
| 2006/0123169 | A1 | * | 6/2006 | Chai et al. ...................... 710/116 |
| 2007/0121399 | A1 | * | 5/2007 | Bains ............................. 365/203 |
| 2007/0250677 | A1 | * | 10/2007 | Ware et al. ..................... 711/167 |
| 2008/0172534 | A1 | * | 7/2008 | Nagabhushana et al. ...... 711/155 |
| 2010/0318732 | A1 | * | 12/2010 | Katsuki et al. ................. 711/105 |
| 2011/0161713 | A1 | * | 6/2011 | Methar et al. .................. 713/400 |

FOREIGN PATENT DOCUMENTS

JP    2008-225775    9/2008

* cited by examiner

*Primary Examiner* — Kaushikkumar Patel
(74) *Attorney, Agent, or Firm* — Rader, Fishman & Grauer PLLC

(57) ABSTRACT

A memory controlling device that includes a request generating section for generating a memory request, a row selecting information retaining section that retains data relative to row address information, a column selecting information retaining section that retains data relative to column address information, a memory bank information for managing section operation states of the memory device, a command generating section for generating operation commands, and a command aligning section that synchronizes the operation commands with the clock.

18 Claims, 22 Drawing Sheets

FIG. 4

| REGISTER NAME[BANK] | MEANINGS |
|---|---|
| ActFlg[X] | 1 WHEN BANK X IS ACTIVE, OR 0 WHEN BANK X IS IDLE |
| ActRow[X] | ROW ADDRESS WHEN BANK X IS ACTIVE |
| ActCnt[X] | +1 WHEN R-REQUEST QUEUE IS POPPED IN BANK X, OR -1 WHEN C-REQEST QUEUE IS POPPED |
| TimActAll | WAITING TIME UNTIL NEXT ACT BECOMES ISSUABLE, WHICH WAITING TIME IS COMMON TO ALL BANKS |
| TimAct[X] | WAITING TIME UNTIL NEXT ACT BECOMES ISSUABLE IN BANK X |
| TimReadAll | WAITING TIME UNTIL NEXT READ BECOMES ISSUABLE, WHICH WAITING TIME IS COMMON TO ALL BANKS |
| TimRead[X] | WAITING TIME UNTIL NEXT READ BECOMES ISSUABLE IN BANK X |
| TimWriteAll | WAITING TIME UNTIL NEXT WRITE BECOMES ISSUABLE, WHICH WAITING TIME IS COMMON TO ALL BANKS |
| TimWrite[X] | WAITING TIME UNTIL NEXT WRITE BECOMES ISSUABLE IN BANK X |
| TimPre[X] | WAITING TIME UNTIL NEXT PRE BECOMES ISSUABLE IN BANK X |

FIG. 5

| JUDGMENT CONTENTS | JUDGMENT CONDITION |
|---|---|
| ACT ISSUABLE STATE | ActFlg[RasReqBnk]=0 |
| ACT ISSUABLE TIME | TimActAll<N & TimAct[RasReqBnk]<N |
| ACT NONNECESSITY | ActFlg[RasReqBnk]=1 & RasReqRow=ActRow[RasReqBnk] |
| READ/WRITE ISSUABLE STATE | ActFlg[CasReqBnk]=1 & ActCnt[CasReqBnk]≧1 |
| READA/WRITEA ISSUABLE STATE | ActCnt[CasReqBnk]=1 & RasReqBnk=CasReqBnk & "ACT NONNECESSITY" DOES NOT HOLD |
| READ ISSUABLE TIME | TimReadAll<N & TimRead[CasReqBnk]<N & CasReqOpc=READ |
| WRITE ACT ISSUABLE TIME | TimWriteAll<N & TimWrite[CasReqBnk]<N & CasReqOpc=WRITE |
| PRE ISSUABLE STATE | ActFlg[X]=1 & ActFlg[X]=0 & "ACT NONNECESSITY" DOES NOT HOLD IN BANK X |
| PRE ISSUABLE TIME | TimPRE [X] IS LESS THAN N IN BANK X |

FIG. 6

| UPDATE REGISTER NAME | UPDATE CONDITIONS | UPDATE CONTENTS |
|---|---|---|
| ActFlg[RasReqBnk] | ISSUE ACT OF RasReqBnk | UPDATE ActFlg[RasReqBnk] TO [1] |
| ActFlg[CasReqBnk] | ISSUE READA OR WRITEA OF CasReqBnk | UPDATE ActFlg[CasReqBnk] TO [1] |
| ActFlg[X] | ISSUE PRE OF BANK X | UPDATE ActFlg[X] TO [0] |
| ActRow[RasReqBnk] | ISSUE ACT OF RasReqBnk | UPDATE ActRow[RasReqBnk] TO [RasReqRow] |
| ActRow[X] | ISSUE PRE OF BANK X | UPDATE ActRow[X] TO INVALID DESIGNATION |
| ActCnt[RasReqBnk] | ISSUE ACT OF RasReqBnk | ADD [1] TO ActCnt[CasReqBnk] |
| | RasReqBnk ACT NONNECESSITY | |
| ActCnt[CasReqBnk] | ISSUE READ OR WRITE OF CasReqBnk | SUBTRACT [1] FROM ActCnt[CasReqBnk] |
| TimActAll | ISSUE ACT OF RasReqBnk | UPDATE TimActAll TO "ACT ISSUANCE TIME + tRRD" |
| TimAct[RasReqBnk] | ISSUE ACT OF RasReqBnk | UPDATE TimAct[RasReqBnk] TO "ACT ISSUANCE TIME + tRC" |
| TimAct[CasReqBnk] | ISSUE READA OF CasReqBnk | UPDATE TimAct[CasReqBnk] TO "READA ISSUANCE TIME + tRPD + tRP" |
| | ISSUE WRITEA OF CasReqBnk | UPDATE TimAct[CasReqBnk] TO "WRITEA ISSUANCE TIME + tWL + BL/2 + tWR + tRP" |
| TimAct[X] | ISSUE PRE OF BANK X | UPDATE TimAct[X] TO "PRE ISSUANCE TIME + tRP" |
| TimReadAll | ISSUE READ OF CasReqBnk | UPDATE TimReadAll TO "READ ISSUANCE TIME + CasReqLng" |
| | ISSUE WRITE OF CasReqBnk | UPDATE TimReadAll TO "WRITE ISSUANCE TIME + tWL + BL/2 + tWTR" |
| TimRead[CasReqBnk] | ISSUE ACT FOR ISSUING READ OF CasReqBnk | UPDATE TimRead[CasReqBnk] TO "ACT ISSUANCE TIME + tRCD" |
| TimWriteAll | ISSUE WRITE OF CasReqBnk | UPDATE TimWriteAll TO "WRITE ISSUANCE TIME + CasReqLng" |
| | ISSUE READ OF CasReqBnk | UPDATE TimWriteAll TO "READ ISSUANCE TIME + BL/2 + tRWD" |
| TimWrite[CasReqBnk] | ISSUE ACT FOR ISSUING WRITE OF CasReqBnk | UPDATE TimWrite[CasReqBnk] TO "ACT ISSUANCE TIME + tRCD" |
| TimPre[RasReqBnk] | ISSUE ACT OF RasReqBnk | UPDATE TimPre[RasReqBnk] TO "ACT ISSUANCE TIME + tRAS" |
| TimPre[CasReqBnk] | ISSUE READ OF CasReqBnk | UPDATE TimPre[CasReqBnk] TO "READ ISSUANCE TIME + MAX(BL/2,tRPD)" |
| | ISSUE WRITE OF CasReqBnk | UPDATE TimPre[CasReqBnk] TO "WRITE ISSUANCE TIME + tWL + BL/2 + tWR" |

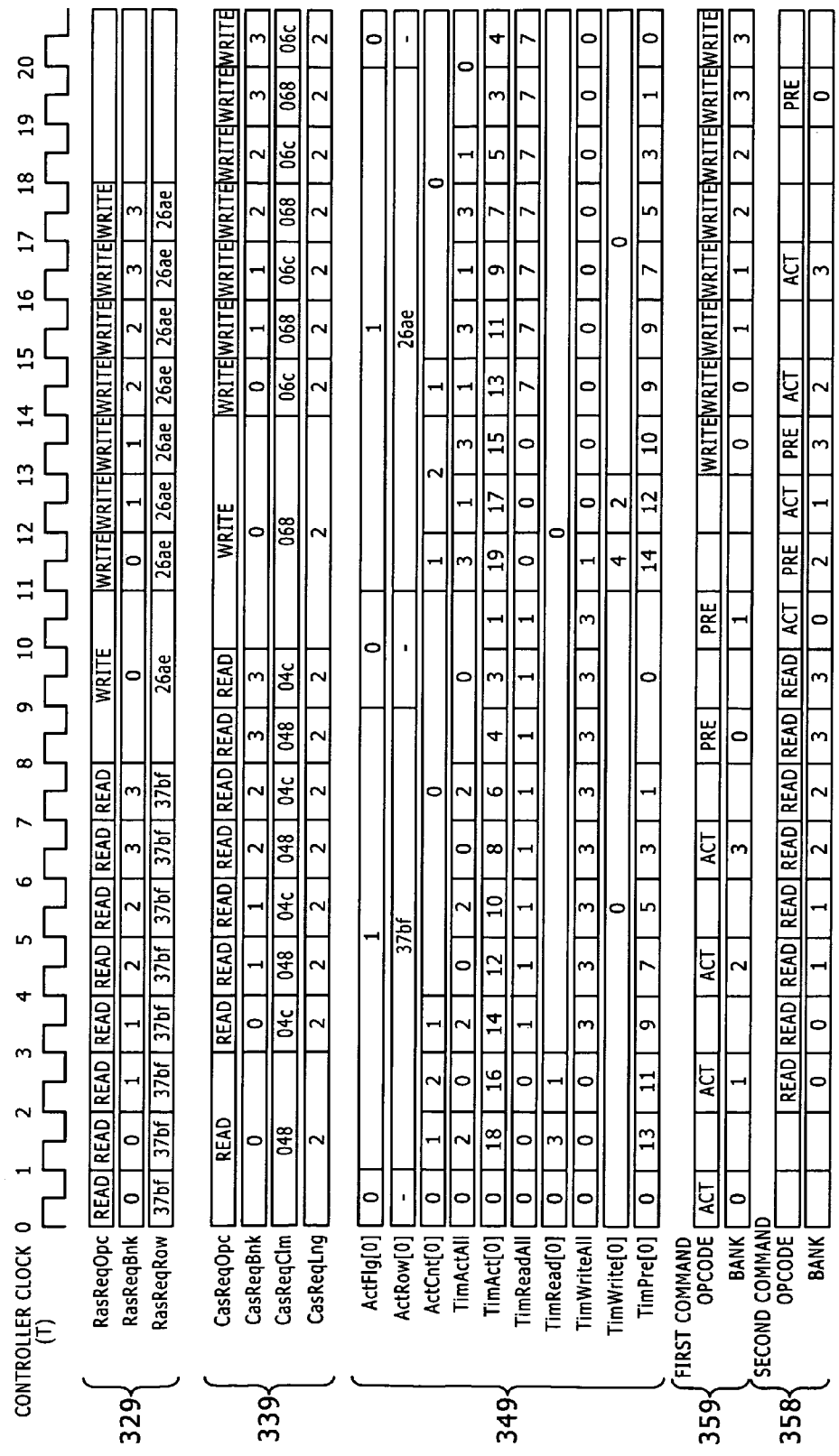

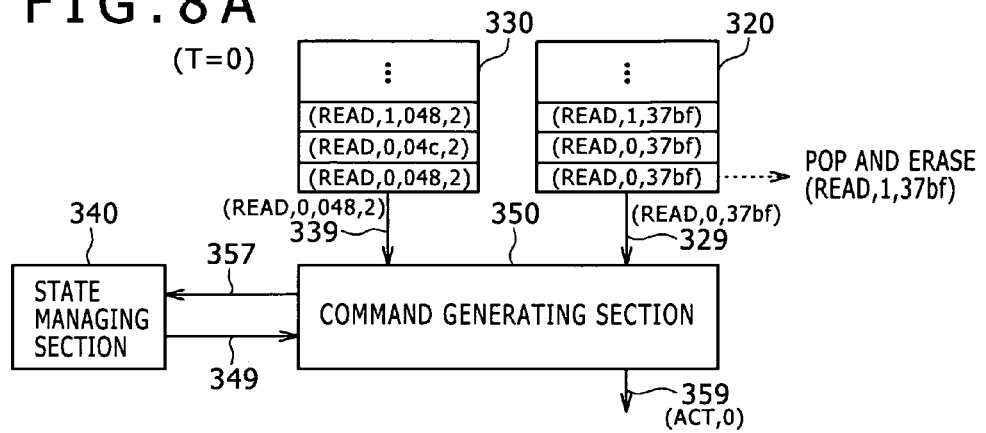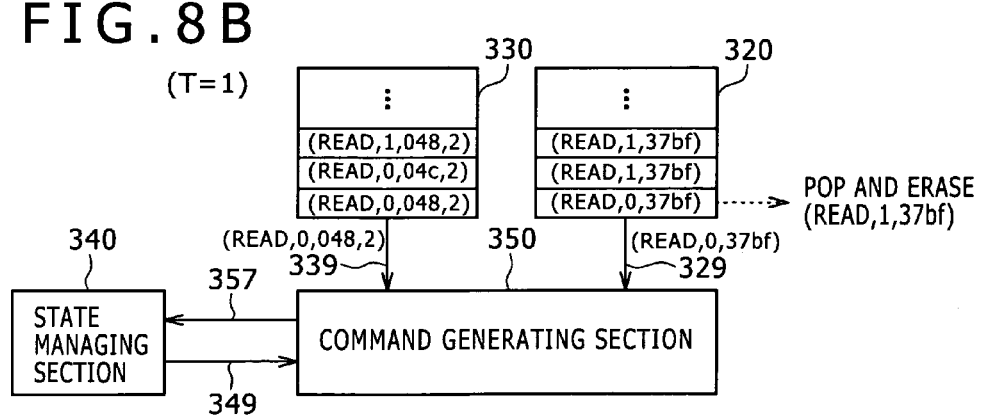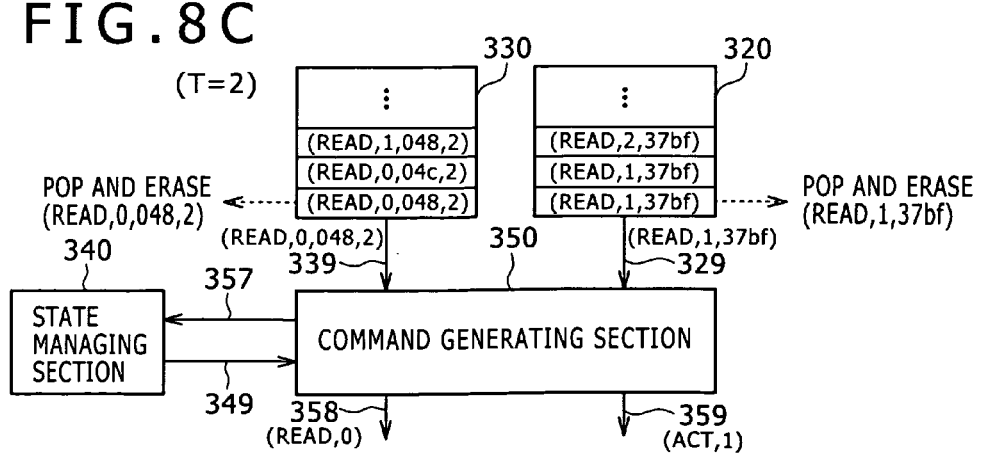

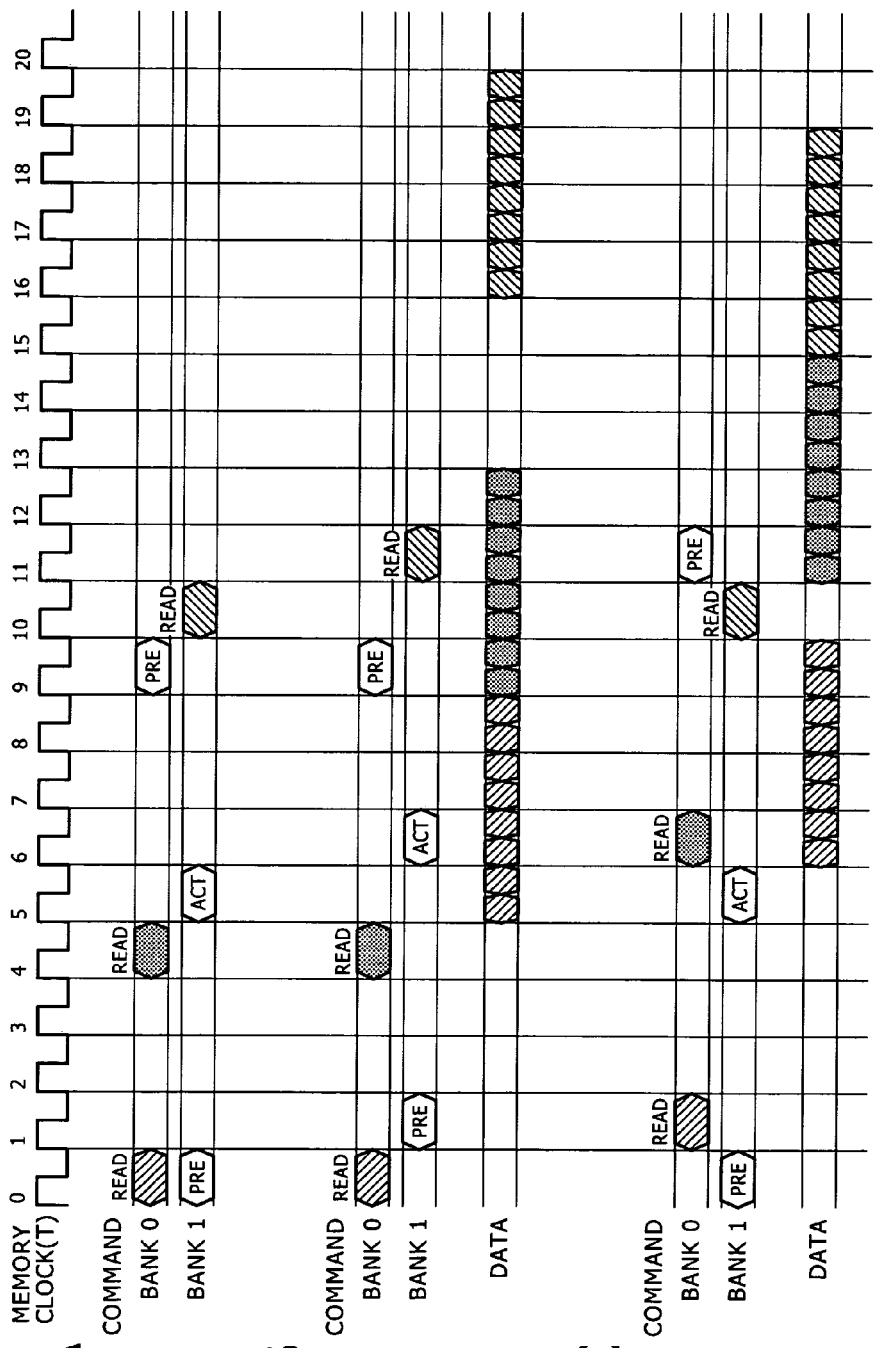

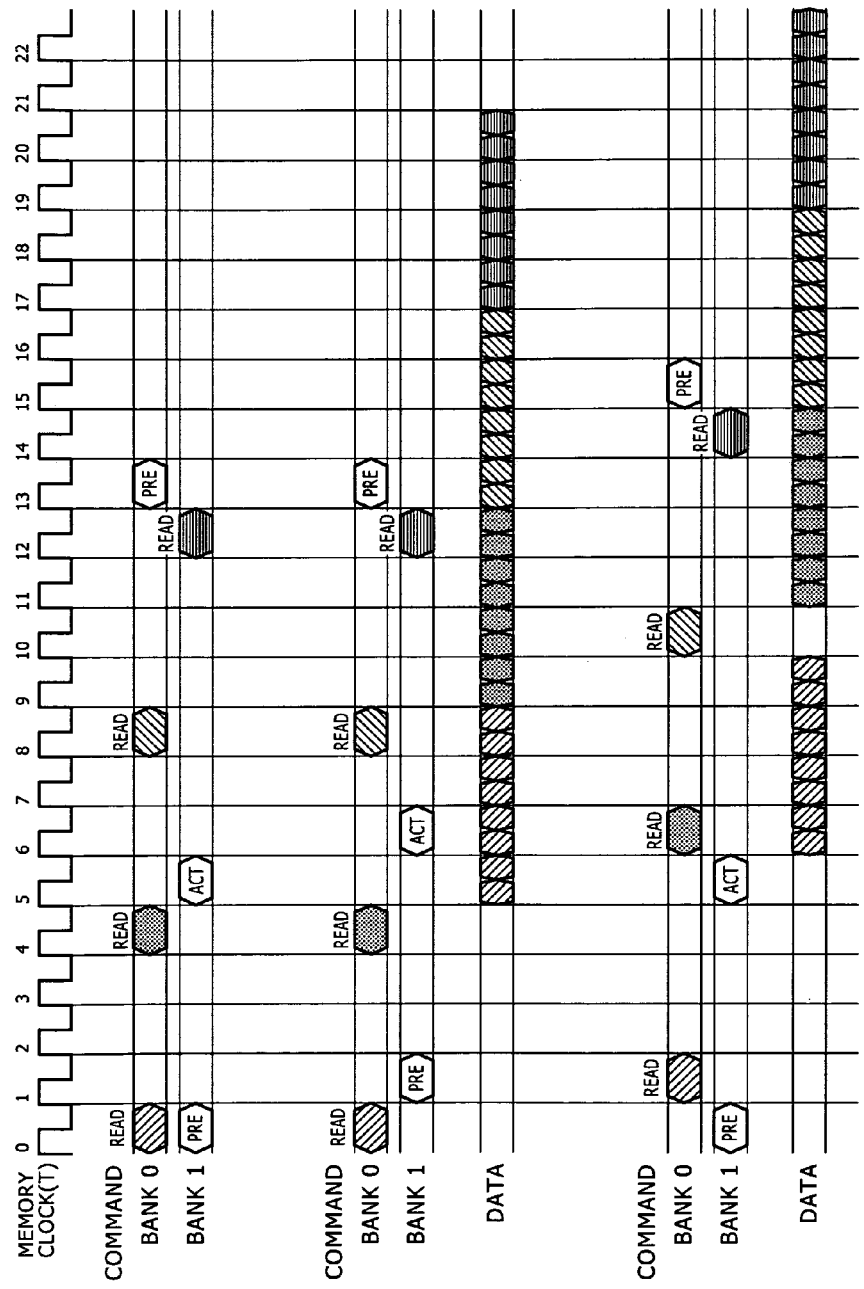

FIG.19

| OPERATION CONTENTS | OPERATION CONDITIONS |
|---|---|
| PRIORITIZED ISSUANCE OF PRE OF RasReqBnk OVER READ OF CasReqBnk | REQUEST ID (R-REQUEST) - REQUEST ID (C-REQUEST) $\leq$ P (P IS MAXIMUM VALUE OF POSITIVE INTEGER P SUCH THAT tRCD + tRP $\geq$ P × BL/2) |
| PRIORITIZED ISSUANCE OF READ OF CasReqBnk OVER PRE OF RasReqBnk | REQUEST ID (R-REQUEST) - REQUEST ID (C-REQUEST) > P (P IS MAXIMUM VALUE OF POSITIVE INTEGER P SUCH THAT tRCD + tRP $\geq$ P × BL/2) |
| PRIORITIZED ISSUANCE OF ACT OF RasReqBnk OVER READ OF CasReqBnk | REQUEST ID (R-REQUEST) - REQUEST ID (C-REQUEST) $\leq$ A (A IS MAXIMUM VALUE OF POSITIVE INTEGER A SUCH THAT tRCD $\geq$ A × BL/2) |
| PRIORITIZED ISSUANCE OF READ OF CasReqBnk OVER ACT OF RasReqBnk | REQUEST ID (R-REQUEST) - REQUEST ID (C-REQUEST) > A (A IS MAXIMUM VALUE OF POSITIVE INTEGER A SUCH THAT tRCD $\geq$ A × BL/2) |

REQUEST ID (R-REQUEST) - REQUEST ID (C-REQUEST) = 3 > P

MEMORY CONTROLLING DEVICE

BACKGROUND OF THE INVENTION

1. Field of the Invention

The present invention relates to a memory controlling device, and particularly to a memory controlling device generating a plurality of commands simultaneously.

2. Description of the Related Art

Traditionally, a memory controller generating a command for a DRAM (Dynamic Random Access Memory) while operating at the same frequency as a memory clock of the DRAM has been used as a memory controller for controlling access to the DRAM. There has recently been a desire for a memory controller generating commands at a frequency lower than that of the memory clock due to increase in speed of the memory clock in an arithmetic processing device. As this memory controller, a memory controller has been proposed which issues $2^N$ (N is an integer of two or more) phases of a control signal supplying a command for a DRAM while operating at $1/2^N$ of frequency of a memory clock (see Japanese Patent Laid-Open No. 2008-225775 (FIG. 1), for example). This memory controller issues $2^N$ phases of a control signal designating operation of the DRAM while operating at $1/2^N$ of the frequency of the memory clock, and converts the control signal into 1 phase in a memory interface circuit.

SUMMARY OF THE INVENTION

The above-described hitherto known technique can operate the memory controller at $1/2^N$ of the frequency of the memory clock by issuing N sets of a two-phase control signal. However, such a memory controller generates a NOP (No OPeration) command in the first phase or the second phase of the two-phase control signal. Thus, when the two-phase control signal is converted to one phase, one NOP command is generated in two cycles, and therefore three or more commands for changing the state of the DRAM cannot be issued consecutively. This causes the problem of a delay in command issuance as compared with a memory controller generating a command for a DRAM while operating at the same frequency as that of the memory clock of the DRAM.

Accordingly, the present invention has been made in view of such a situation, and it is desirable to generate a plurality of commands efficiently at a frequency lower than that of a memory clock.

A first embodiment of the present invention is a memory controlling device including: a request generating section configured to generate memory requests from a data access request to a memory controlled in each of memory banks; and a row selecting information retaining section configured to retain a plurality of opcodes, memory bank numbers specifying the memory banks, and row addresses specifying row addresses in the memory banks in the memory requests as row selecting information while maintaining input order of the memory requests. The device further includes a column selecting information retaining section configured to retain a plurality of the opcodes, the memory bank numbers, column addresses specifying column addresses in the memory banks, and data lengths of data to be accessed according to the memory requests in the memory requests as column selecting information while maintaining the input order of the memory requests. The device further includes: a memory bank information managing section configured to manage a state of operation of the memory as memory bank information for each memory bank; a command generating section configured to generate a plurality of commands designating operation related to the memory banks at a frequency lower than frequency of a memory clock of the memory on a basis of the row selecting information, the column selecting information, and the memory bank information; and a command aligning section configured to align the plurality of generated commands in synchronism with the memory clock. This produces an effect of generating a plurality of commands designating operation related to the memory banks at a frequency lower than that of the memory clock.

In addition, in the first embodiment, the command generating section may generate N (N is an integer of two or more) commands at 1/N of the frequency of the memory clock. This produces an effect of generating N commands at 1/N of the frequency of the memory clock.

In addition, in the first embodiment, the request generating section may generate the memory requests in burst length units according to the data length of the data access request. This produces an effect of generating memory requests in burst length units.

In addition, in the first embodiment, when there is a vacancy in both of the row selecting information retaining section and the column selecting information retaining section, the request generating section may input a new memory request to both of the row selecting information retaining section and the column selecting information retaining section. This produces an effect of inputting a new memory request to both of the row selecting information retaining section and the column selecting information retaining section when there is a vacancy in both of the row selecting information retaining section and the column selecting information retaining section.

In addition, in the first embodiment, the row selecting information retaining section may be formed by a queue performing first-in first-out operation on the row selecting information, and the command generating section may extract the row selecting information retained by the row selecting information retaining section from the row selecting information retaining section when the command generating section generates a command specifying a row address among the commands on a basis of the row selecting information or when the row address specified by the row selecting information coincides with the row address specified as an object for data access in the memory bank. This produces an effect of extracting oldest row selecting information in the input order from the row selecting information retaining section when a command specifying a row address is generated on the basis of the row selecting information in the forefront and when a row address specified by the oldest row selecting information in the input order coincides with a row address specified as an object for data access in a memory bank.

In addition, in the first embodiment, the column selecting information retaining section may be formed by a queue performing first-in first-out operation on the column selecting information, and the command generating section may extract the column selecting information retained by the column selecting information retaining section from the column selecting information retaining section when the command generating section generates a command specifying a column address among the commands on a basis of the column selecting information. This produces an effect of extracting oldest column selecting information in the input order from the column selecting information retaining section when a command specifying a column address is generated on the basis of the oldest column selecting information in the input order.

In addition, in the first embodiment, the memory controlling device may further include a waiting information retaining section configured to extract the row selecting information from the row selecting information retaining section and retain the row selecting information as waiting row selecting information when the command generating section waits to generate a command specifying a row address among the commands, and the command generating section may generate the commands on a basis of oldest row selecting information in the input order, the oldest row selecting information being retained by the row selecting information retaining section, the waiting row selecting information, the column selecting information, and the memory bank information. This produces an effect of generating the commands on the basis of the waiting row selecting information, the row selecting information, the column selecting information, and the memory bank information.

In addition, in the first embodiment, the request generating section may supply the memory requests with request identifiers as order of the memory requests, the row selecting information retaining section may further retain a request identifier as row selecting information, the column selecting information retaining section may further retain a request identifier as column selecting information, and the command generating section may preferentially generate a command specifying a column address before another command among the commands when a difference between the request identifier of the row selecting information and the request identifier of the column selecting information is higher than a predetermined value. This produces an effect of generating a command specifying a column address before another command when a difference between the request identifier of the row selecting information and the request identifier of the column selecting information is higher than a predetermined value.

In addition, in the first embodiment, the memory controlling device may further include a command synchronizing and outputting section configured to output the plurality of commands generated by the command generating section to the command aligning section in synchronized timing while maintaining frequency of the command generating section. This produces an effect of outputting the plurality of commands generated by the command generating section in synchronized timing while maintaining frequency of the command generating section.

A second embodiment of the present invention is a memory controlling device including: an operation designation supplying section configured to supply opcodes, column addresses, and row addresses for generating commands designating operation for a memory; and a row selecting information retaining section configured to retain the row addresses for generating the commands as row selecting information. The device further includes: a column selecting information retaining section configured to retain the opcodes and the column addresses as column selecting information; and a memory information managing section configured to manage memory information retaining a row address in an active state in the memory and timing in which the commands can be generated. The device further includes: a command generating section configured to generate a plurality of the commands at a frequency lower than frequency of a memory clock of the memory by generating a command to read row data corresponding to the row address from the memory among the commands on a basis of the memory information and the row selecting information and a command to read data corresponding to a column address from the row data among the commands on a basis of the memory information and the column selecting information; and a command aligning section configured to align the plurality of generated commands in synchronism with the memory clock. This produces an effect of generating the plurality of commands designating operation related to the memory at a frequency lower than that of the memory clock.

According to the present invention, an excellent effect of being able to generate a plurality of commands efficiently while operating at a frequency lower than that of a memory clock can be produced.

BRIEF DESCRIPTION OF THE DRAWINGS

FIG. 4 is a list showing an example of memory bank information managed by a state managing section in the first embodiment of the present invention;

FIG. 5 is a list showing an example of contents determined to generate each command by a command generating section in the first embodiment of the present invention;

FIG. 6 is a list showing an example of updating memory bank information in the state managing section in the first embodiment of the present invention;

FIG. 7 is a timing chart showing an example of operation of a command determining block in the first embodiment of the present invention;

FIGS. 8A, 8B, and 8C are schematic diagrams showing operations of the command generating section which operations correspond to cycles of T=0 to T=2, respectively;

FIGS. 16A, 16B, and 16C are timing charts showing an example of a command collision avoidance when efficiency of data readout is improved by avoiding command collision with priority given to a precharge command PRE in the first and second embodiments of the present invention;

FIGS. 17A, 17B, and 17C are timing charts showing an example of a command collision avoidance when efficiency of data readout is improved by avoiding command collision with priority given to READ in the first and second embodiments of the present invention;

FIG. 19 is a list showing an example of contents determined to perform command collision avoiding operation by a command generating section in the third embodiment of the present invention;

DETAILED DESCRIPTION OF THE PREFERRED EMBODIMENTS

The mode for carrying out the present invention (hereinafter referred to as embodiments) will be described. Description will be made in the following order.

1. First Embodiment (DRAM Control: Example of Memory Controller Operating at Half of Frequency of Memory Clock)

2. Second Embodiment (DRAM. Control: Example of Command Determining Block Having H-Request Queue Extracting Row Selecting Information and Retaining Row Selecting Information as Standby Row Selecting Information)

3. Third Embodiment (DRAM Control: Example of Command Determining Block Adding Request ID to Memory Request)

<1. First Embodiment>
[First Example of Configuration of Memory Controlling Device]

Figure 1:
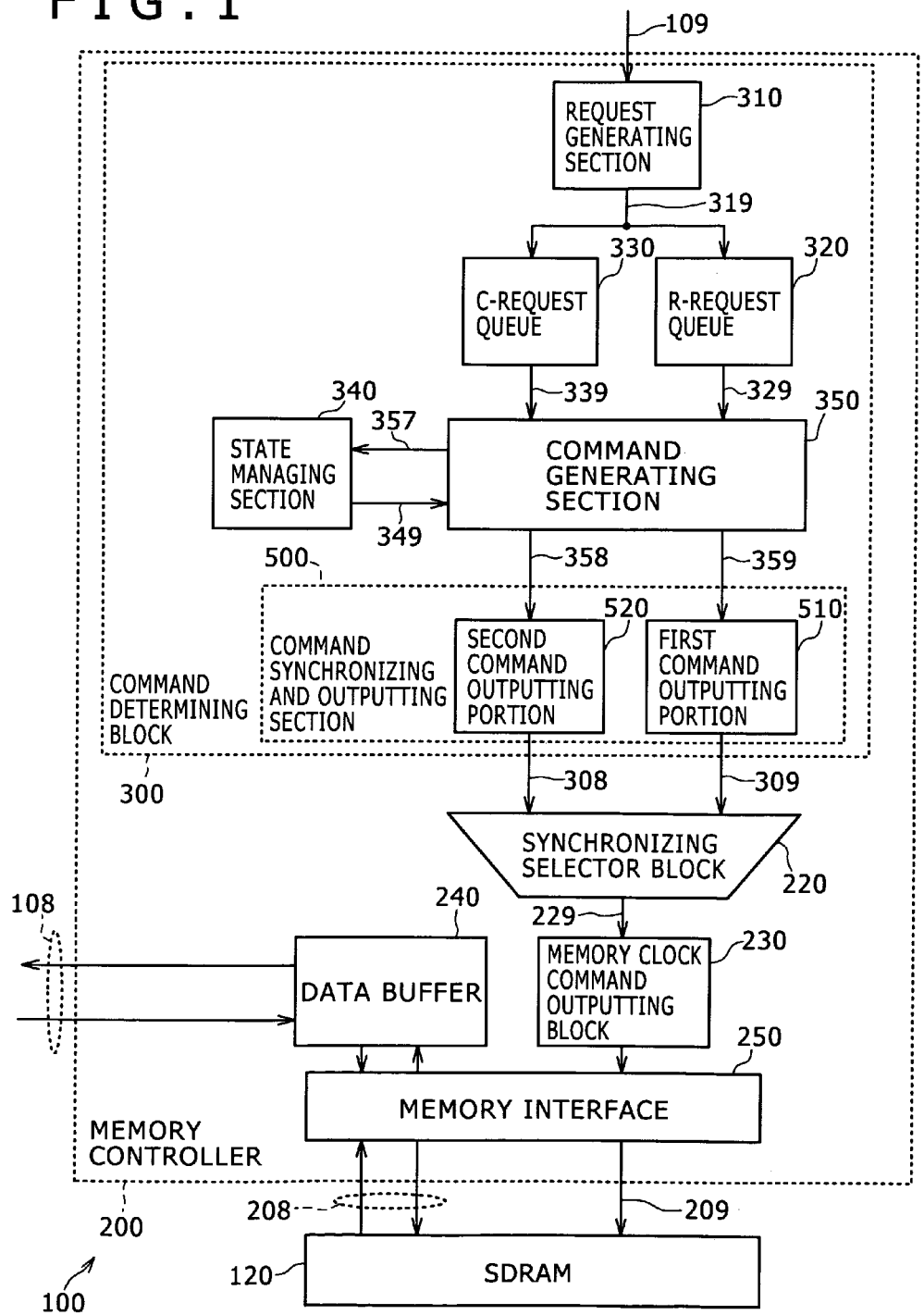
FIG. 1 is a block diagram showing a first example of configuration of a memory controlling device in a first embodiment of the present invention.

FIG. 1 is a block diagram showing an example of configuration of a memory controlling device 100 according to a first embodiment of the present invention. Description in the following will be made of an example of a memory controller 200 that simultaneously generates two commands at half of frequency of a memory clock of an SRAM (Synchronous DRAM) 120.

The memory controlling device 100 includes the memory controller 200 and the SDRAM 120. The memory controller 200 designates operation related to the SDRAM 120. The memory controller 200 has a command determining block 300, a synchronizing selector block 220, a memory clock command outputting block 230, a data buffer 240, and a memory interface 250.

The command determining block 300 determines a command for designating operation related to the SDRAM 120 on the basis of a data access request supplied via a signal line 109. The data access request in this case is a signal for requesting the SDRAM 120 to read and write data. The command determining block 300 includes a request generating section 310, an R-request queue 320, a C-request queue 330, a state managing section 340, a command generating section 350, and a command synchronizing and outputting section 500.

The request generating section 310 generates a memory request by combining and dividing data access requests. The memory request is obtained by shaping data access requests into burst length units to designate operation related to the SDRAM 120. The request generating section 310 for example divides a data access request with a data length longer than a burst length, and thereby generates a plurality of memory requests in burst length units. In addition, the request generating section 310 for example combines data access requests for consecutive data having a data length shorter than the burst length with each other, and thereby generates a memory request in a burst length unit. When the R-request queue 320 and the C-request queue 330 both have vacancies, the request generating section 310 supplies the generated memory requests to both of the R-request queue 320 and the C-request queue 330 via a signal line 319. Incidentally, the request generating section 310 is an example of a request generating section and an operation designation supplying section described in claims.

The R-request queue 320 retains row selecting information for generating a command specifying a row address supplied to the SDRAM 120 by the memory controller 200. The R-request queue 320 retains information necessary to generate commands specifying row addresses in memory requests supplied from the request generating section 310 as row selecting information while maintaining the order of the memory requests. The R-request queue 320 is formed by an FIFO (First-In First-Out) type queue that performs first-in first-out operation, for example. Of the row selecting information retained by the R-request queue 320, oldest row selecting information (hereinafter referred to as an R-request) in input order is output to the command generating section 350. This R-request is extracted and deleted by the command generating section 350 when a command specifying a row address has been generated in the command generating section 350 on the basis of the R-request. In addition, this R-request is deleted by being extracted by the command generating section 350 when a row address of a memory bank specified by the R-request coincides with a row address specified as an object of data access in that memory bank. Then, oldest row selecting information in input order is output as a new R-request to the command generating section 350. Incidentally, the R-request queue 320 is an example of a row selecting information retaining section described in claims.

The C-request queue 330 retains column selecting information for generating a command specifying a column address supplied to the SDRAM 120 by the memory controller 200. The C-request queue 330 retains information necessary to generate commands specifying column addresses in memory requests supplied from the request generating section 310 as column selecting information while maintaining the order of the memory requests. The C-request queue 330 is formed by an FIFO type queue that performs first-in first-out operation, for example. Of the column selecting information retained by the C-request queue 330, oldest column selecting information (hereinafter referred to as a C-request) in input order is output to the command generating section 350. This C-request is extracted and deleted by the command generating section 350 when a command specifying a column address has been generated in the command generating section 350 on the basis of the C-request. Then, oldest column selecting information in the input order is output as a new C-request to the command generating section 350. Incidentally, the C-request queue 330 is an example of a column selecting information retaining section described in claims.

The state managing section 340 manages memory bank information indicating a state of operation of the SDRAM 120. This state managing section 340 for example manages information on a state of a row to be accessed in a memory bank and waiting time information on a waiting time until a command becomes issuable in each bank as memory bank information for each memory bank. When a command is generated in the command generating section 350, the state managing section 340 updates information related to that command which information is included in the memory bank information. In addition, the state managing section 340 has a countdown timer, and presents a time at which a command becomes issuable by subtracting from the waiting time information of the memory bank information.

The state managing section 340 for example subtracts N from each piece of waiting time information on a waiting time until a command becomes issuable in each cycle of a controller clock, which has the frequency of the command generating section 350. In this case, N indicates a maximum number of commands that can be generated simultaneously in the command generating section 350. In the present embodiment, description will be made supposing that the maximum number N of commands that can be generated simultaneously is "2." Thus, the state managing section 340 subtracts two from waiting time information on a waiting time until a command becomes issuable in each cycle of the controller clock. The state managing section 340 supplies the memory bank information to the command generating section 350 via a signal line 349. Incidentally, the state managing section 340 is an example of a memory bank information managing section and a memory information managing section described in claims.

The command generating section 350 generates a command to be supplied to the SDRAM 120 by the memory controller 200. The command generating section 350 generates a command designating operation related to the SDRAM 120 on the basis of the row selecting information input via a signal line 329, the column selecting information input via a signal line 339, and the memory bank information input via the signal line 349. The command generating section 350 generates a plurality of commands designating operation related to the SDRAM 120 at a frequency lower than that of the memory clock of the SDRAM 120. For example, the command generating section 350 generates N commands at 1/N of the frequency of the memory clock. Suppose in this case that the command generating section 350 operates at ½ of the frequency of the memory clock and generates two commands as a first command and a second command simultaneously. The command generating section 350 supplies the first command and the second command generated simultaneously to the command synchronizing and outputting section 500 via a signal line 359 and a signal line 358. The command generating section 350 supplies information indicating that the commands have been generated to the state managing section 340 via a signal line 357. Incidentally, the command generating section 350 supplies the commands to the command synchronizing and outputting section 500 via a set of signal lines corresponding to the number of commands generated simultaneously. Incidentally, the command generating section 350 may supply the plurality of generated commands to the memory interface 250. Incidentally, the command generating section 350 is an example of a command generating section described in claims.

The command synchronizing and outputting section 500 outputs the plurality of commands supplied from the command generating section 350 in synchronized timing while maintaining the frequency of the controller clock, which frequency is the frequency of the command generating section 350. The command synchronizing and outputting section 500 supplies the synchronizing selector block 220 with the plurality of commands in synchronized timing. The command synchronizing and outputting section 500 includes a first command outputting portion 510 and a second command outputting portion 520. Incidentally, the command synchronizing and outputting section 500 includes the first command outputting portion 510 and the second command outputting portion 520 the number of which corresponds to the number of commands supplied from the command generating section 350. Incidentally, the command synchronizing and outputting section 500 is an example of a command synchronizing and outputting section described in claims.

The first command outputting portion 510 temporarily retains the first command supplied via the signal line 359. The first command outputting portion 510 is supplied with a clock common to the second command outputting portion 520. The first command outputting portion 510 outputs the first command in timing synchronized with the clock. The first command outputting portion 510 supplies the first command in frequency timing synchronized with the second command to the synchronizing selector block 220 via a signal line 309.

The second command outputting portion 520 temporarily retains the second command supplied via the signal line 358. The second command outputting portion 520 is supplied with a clock common to the first command outputting portion 510. The second command outputting portion 520 outputs the second command in timing synchronized with the clock. The second command outputting portion 520 supplies the second command in frequency timing synchronized with the first command to the synchronizing selector block 220 via a signal line 308.

The synchronizing selector block 220 aligns the plurality of commands supplied from the command determining block 300 in synchronism with the memory clock. This synchronizing selector block 220 generates commands of the same frequency as the memory clock from N commands of 1/N of the frequency of the memory clock by aligning the plurality of commands supplied simultaneously in predetermined order. The synchronizing selector block 220 generates commands in synchronism with timing of the same frequency as the memory clock by alternately aligning the two commands supplied from the command determining block 300 such that the first command supplied from the signal line 309 comes first. The synchronizing selector block 220 supplies the generated commands to the memory clock command outputting block 230 via a signal line 229. Incidentally, the synchronizing selector block 220 is an example of a command aligning section described in claims.

The memory clock command outputting block 230 outputs the commands of the same frequency as the memory clock which commands are supplied from the synchronizing selector block 220 in synchronism with the timing of the memory clock. The memory clock command outputting block 230 supplies the memory interface 250 with the commands in timing synchronized with the memory clock.

The data buffer 240 temporarily retains data to be read or written according to a data access request. When the data buffer 240 is supplied with data to be written to the SDRAM 120 via a signal line 108 according to a data access request, the data buffer 240 supplies the memory interface 250 with the data to be written in timing synchronized with a memory clock command. When the data buffer 240 retains data read from the SDRAM 120 according to a data access request, the data buffer 240 outputs the data to a device that issued the data access request via the signal line 108.

The memory interface 250 performs data transmission between the memory controller 200 and the SDRAM 120. When writing data to the SDRAM 120, the memory interface 250 outputs a command and the data to the SDRAM 120 via an address/command bus 209 and a memory bus 208. When reading data from the SDRAM 120, the memory interface 250 outputs a command to the SDRAM 120 via the address/command bus 209, and receives data read thereby via the memory bus 208. Incidentally, the memory interface 250 may be configured to be supplied with the plurality of commands of the same frequency as the memory clock from the command generating section 350 by using a memory interface 250 having the function of the synchronizing selector block 220.

The SDRAM 120 is a storage device that can read data and write data by an operation designated by the memory controller 200. The SDRAM 120 is an aggregate of elements referred to as memory cells and storing one bit. The SDRAM 120 can be formed so as to include a plurality of aggregates of certain amounts of memory cells, which aggregates are referred to as memory banks. The SDRAM 120 may be for example a DDR2 SDRAM (Double Data Rate 2 SDRAM), a DDR3 SDRAM or the like for ordinary personal computers. Incidentally, the SDRAM 120 is an example of a memory described in claims.

[Example of Operation of DDR2 SDRAM]

Figure 2:
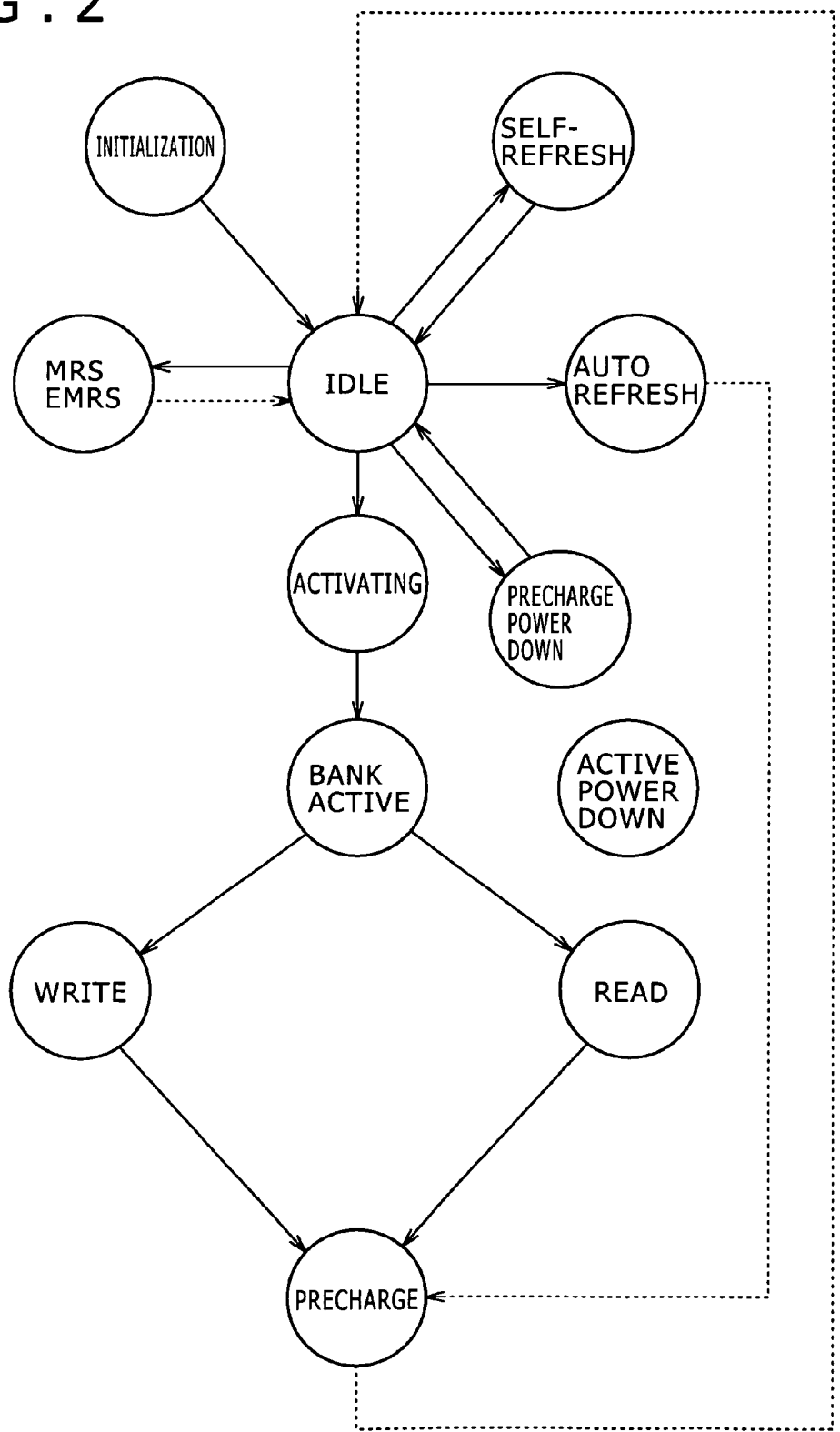
FIG. 2 is a state diagram of an SDRAM is in the first embodiment of the present invention.

FIG. 2 is a state diagram of the SDRAM 120 in the first embodiment of the present invention. Incidentally, description in the following will be made supposing that the SDRAM 120 is a DDR2 SDRAM.

After power is turned on, the SDRAM 120 undergoes an initializing operation, and makes a transition from an initialized state to an idle state.

Thereafter, in a state of MRS (Mode Registers Set) and EMRS (Extended Mode Registers Set), settings in various operation modes such as burst length of DRAM, latency, and the like are made.

When an active command (ACT) specifying a row address is issued in the idle state, the SDRAM 120 makes a transition from the idle state through an activating state to a bank active state. In this bank active state, data retained by memory cells at the row address specified by the ACT is all read out into a temporary storage device provided to the SDRAM 120. At this time, the transition from the activating state to the bank active state is made automatically on the DDR2 side. Incidentally, the active command is an example of a command specifying a row address described in claims.

Thereafter, when a write command (WRITE) specifying a column address is issued, the SDRAM 120 makes a transition to a write state, and stores write data in memory after the passage of the time of write latency. In this write state, the write data is stored by writing the write data to the temporary storage device of the SDRAM 120 retaining the data at the row address with a memory cell specified by the column address as a starting point. After the storing of the write data is completed, precharge is performed after the time of write recovery, and then a return is made to the idle state.

On the other hand, when a read command (READ) specifying a column address is issued, the SDRAM 120 makes a transition to a read state, and read data is output from the SDRAM 120 after the passage of the time of read latency. In this read state, the read data is read by reading the read data from the temporary storage device of the SDRAM 120 retaining the data at the row address with a memory cell specified by the column address as a starting point. After the output of the read data is completed, a precharge command (PRE) is issued and precharge is performed after the time of read recovery, and then a return is made to the idle state. In this precharge, the data stored in the temporary storage device provided to the SDRAM 120 is written to the memory cells specified by the row address. Incidentally, the write command and the read command are an example of a command specifying a column address described in claims.

Thus, the SDRAM 120 makes a state transition according to a command related to operation from the command generating section 350. The memory controller 200 generates a command related to the operation of the SDRAM 120 on the basis of a data access request supplied via a signal line 109.

[Example of Operation of Request Generating Section]

Figure 3:
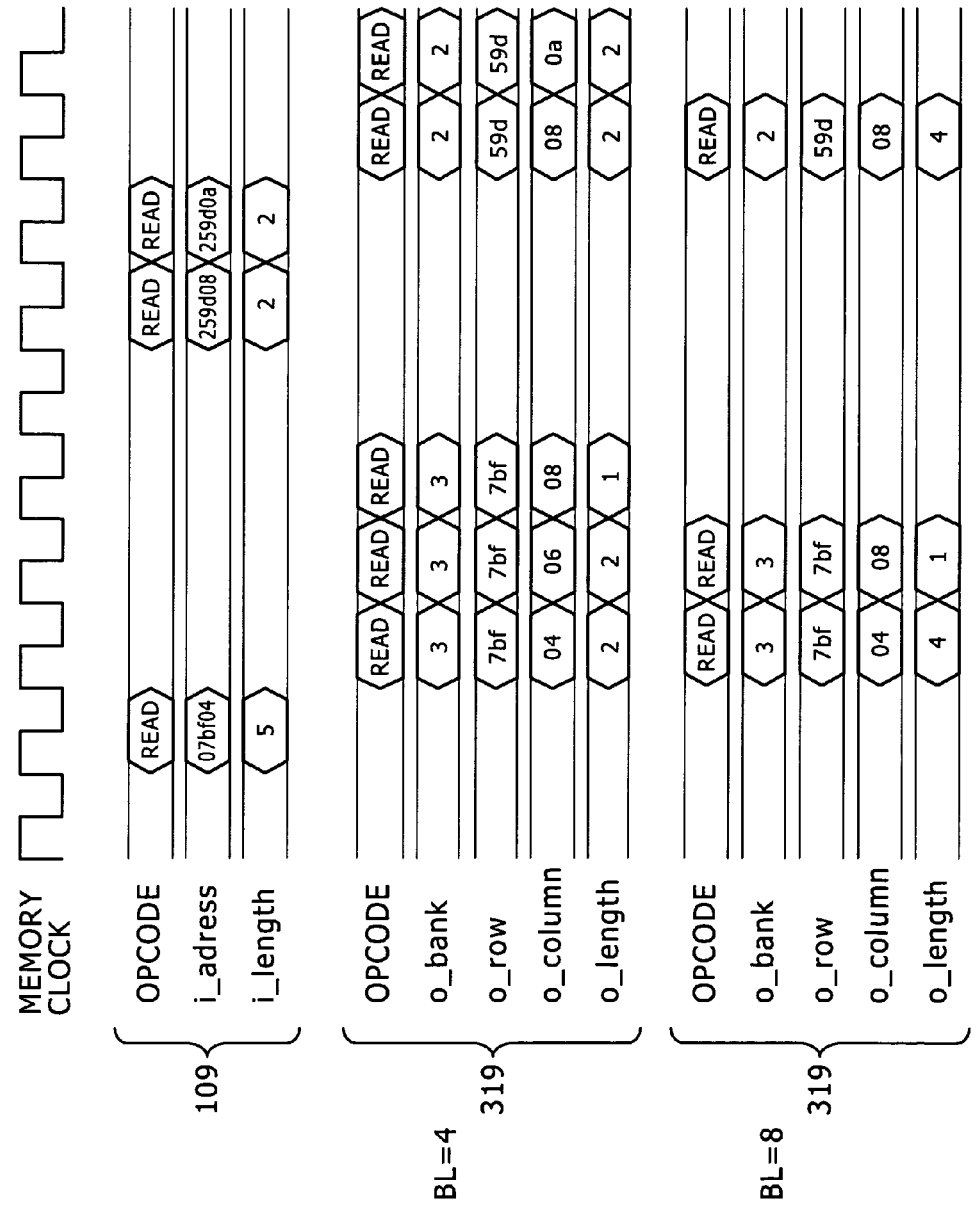
FIG. 3 is a timing chart showing an example of operation of a request generating section in the first embodiment of the present invention.

FIG. 3 is a timing chart showing an example of operation of the request generating section 310 in the first embodiment of the present invention. With an axis of abscissas as a common time axis, FIG. 3 shows signals in the signal line 109, the signal line 319 when burst length is set at 4 (BL=4), and the signal line 319 when burst length is set at 8 (BL=8). In addition, in this case, the request generating section 310 in the memory controller 200 controlling the operation of a DDR2 SDRAM (DDR2-800) having a memory clock of 400 MHz is assumed as the request generating section 310.

In the signal line 109, an opcode represents the signal of an instruction to the SDRAM 120 in a data access request, and i_address represents a signal indicating the address of a memory cell where access is started according to the instruction in the data access request. In the signal line 109, i_length indicates data to be accessed according to the instruction in the data access request. In this case, i_length is represented by units of memory clock length. Specifically, when i_length is "5" in the DDR2-800, i_length indicates data of 10 bits.

In the signal line 319 when settings are made such that "BL=4" and "BL=8," an opcode indicates the signal of an instruction to the SDRAM 120 in a memory request, and o_bank indicates the signal of a bank number specifying a bank to be accessed in the memory request. In the signal line 319, o_row represents a signal specifying a row address of a memory cell where access is started in the memory request, and o_column indicates a signal specifying a column address of the memory cell where the access is started in the memory request. In the signal line 319, o_length indicates bit length of data to be accessed according to an instruction in the memory request. In this case, o_length is represented by units of memory clock length. o_length has a maximum memory clock length of "2" when "BL=4" is set. o_length has a maximum memory clock length of "4" when "BL=8" is set.

Incidentally, the opcode is an example of an opcode in a memory request described in claims and an opcode supplied by an operation designation supplying section. o_bank is an example of a memory bank number in a memory request described in claims. o_row is an example of a row address in a memory request described in claims and a row address supplied by an operation designation supplying section. o_column is an example of a column address in a memory request described in claims and a column address supplied by an operation designation supplying section. o_length is an example of data length in a memory request described in claims.

When a data access request whose i_length is "5" is input to the request generating section 310 in the case of the setting of "BL=4" via the signal line 109, the request generating section 310 generates two memory requests whose o_length is "2" and generates one memory request whose o_length is "1." When data access requests whose i_length is "2" for two consecutive addresses are input to the request generating section 310 in the case of the setting of "BL=4" via the signal line 109, the request generating section 310 generates two memory requests whose o_length is "2."

When the data access request whose i_length is "5" is input to the request generating section 310 in the case of the setting of "BL=8" via the signal line 109, the request generating section 310 generates one memory request whose o_length is "4" and generates one memory request whose o_length is "1." When the data access requests whose i_length is "2" for the two consecutive addresses are input to the request generating section 310 in the case of the setting of "BL=8" via the signal line 109, the request generating section 310 generates one memory request whose o_length is "4."

Thus, the request generating section 310 generates memory requests in burst length units by combining and dividing data access requests. In addition, when a command designating operation related to the SDRAM 120 is input to the request generating section 310, the request generating section 310 outputs the command as it is.

[Example of Memory Bank Information of State Managing Section]

FIG. 4 is a list showing an example of memory bank information managed by the state managing section 340 in the first embodiment of the present invention. FIG. 4 shows register names indicating registers retaining information managed as memory bank information in a left column, and shows meanings of the information retained by the registers in a right column.

ActFlg[X] is a register indicating "1" for a state (Active) in which a row address is specified in a bank X and indicating a value of "0" for a state (Idle) in which no row address is specified in the bank X. Incidentally, this Active refers to the activating state, the bank active state, the write state, and the read state shown in FIG. 2. In addition, Idle refers to the idle state, the auto refresh state, the self-refresh state, the pre-charge state, the MRS state, and the EMRS state shown in FIG. 2.

ActRow[X] is a register indicating the value of a specified row address when the bank X is active.

ActCnt[X] is a register indicating a value to which "1" is added when row selecting information of the bank X is extracted and deleted (popped) in the R-request queue 320, and from which value "1" is subtracted when column selecting information of the bank X is popped in the C-request queue 330.

TimActAll is a register common to all banks of the SDRAM 120, and indicating a waiting time until a next ACT becomes issuable by a number of cycles of the memory clock.

TimAct[X] is a register indicating a waiting time until a next ACT becomes issuable in the bank X by a number of cycles of the memory clock.

TimReadAll is a register common to all the banks of the SDRAM 120, and indicating a waiting time until a next READ becomes issuable by a number of cycles of the memory clock.

TimRead[X] is a register indicating a waiting time until a next READ becomes issuable in the bank X by a number of cycles of the memory clock.

TimWriteAll is a register common to all the banks of the SDRAM 120, and indicating a waiting time until a next WRITE becomes issuable by a number of cycles of the memory clock.

TimWrite[X] is a register indicating a waiting time until a next WRITE becomes issuable in the bank X by a number of cycles of the memory clock.

TimPre[X] is a register indicating a waiting time until a next precharge command PRE becomes issuable in the bank X by a number of cycles of the memory clock.

TimActAll, TimAct[X], TimReadAll, TimRead[X], TimWriteAll, TimWrite[X], and TimPre[X] are registers having a minimum value of "0." In these registers, "N," which is a maximum number of commands that can be generated simultaneously by the command generating section 350, is subtracted by the countdown timer of the state managing section 340 in each cycle of the controller clock.

Thus, the state managing section 340 retains and manages the bank operation information and the waiting time information on waiting times until commands become issuable as memory bank information for each bank. It is to be noted that the registers shown in FIG. 4 are assumed as a minimum of registers necessary to operate the memory controlling device 100 according to the first embodiment of the present invention, and that the memory bank information of the state managing section 340 is not limited to only the memory bank information shown in FIG. 4.

[Example of Command Generating Judgment in Command Generating Section]

FIG. 5 is a list showing an example of contents determined to generate each command by the command generating section 350 in the first embodiment of the present invention. FIG. 5 shows contents determined to generate a command by the command generating section 350 in a left column, and shows conditions for the judgment in a right column.

An ACT issuable state indicates a condition for the command generating section 350 to issue ACT to a bank (RasReqBnk) specified by an R-request. The condition of this ACT issuable state holds when ActFlg[RasReqBnk] is [0], that is, ActFlg[RasReqBnk] indicates the Idle state.

An ACT issuable time indicates timing for the command generating section 350 to issue the ACT when the condition of the ACT issuable state holds. This ACT issuable time holds when TimReadAll is smaller than N and TimAct[RasReqBnk] is smaller than N, where N denotes a maximum number of commands that can be generated simultaneously in the command generating section 350.

An ACT nonnecessity indicates a condition when the command generating section 350 does not need to issue ACT to a row address specified by an R-request. This ACT nonnecessity holds when ActFlg[RasReqBnk] is "1" and RasReqBnk coincides with ActRow[RasReqBnk].

A READ/WRITE issuable state indicates a condition for the command generating section 350 to issue READ or WRITE to a bank (CasReqBnk) specified by a C-request. This READ/WRITE issuable state holds when ActFlg[CasReqBnk] is "1" and ActCnt[CasReqBnk] is "1" or more.

A READA (READ with PRE)/WRITEA (WRITE with PRE) issuable state indicates a condition for further issuing a precharge command PRE automatically after issuing READ/WRITE. This READA/WRITEA issuable state holds when ActCnt[CasReqBnk] is "1," RasReqBnk and CasReqBnk are the same, and the "ACT nonnecessity" does not hold.

A READ issuable time indicates timing for the command generating section 350 to issue READ when the condition of the READ/WRITE issuable state holds. The READ issuable time holds when TimReadAll is smaller than N, TimRead[CasReqBnk] is smaller than N, and the opcode (CasReqOpc) of a C-request is READ.

A WRITE issuable time indicates timing for the command generating section 350 to issue WRITE when the condition of the READ/WRITE issuable state holds. The WRITE issuable time holds when TimWriteAll is smaller than N, TimWrite[CasReqBnk] is smaller than N, and CasReqOpc is WRITE.

A PRE issuable state indicates a condition for the command generating section 350 to issue a precharge command PRE to the bank X. This PRE issuable state holds when in the bank X, ActFlg[X] is "1," ActCnt[X] is [0], and the "ACT nonnecessity" does not hold.

A PRE issuable time indicates timing for the command generating section 350 to issue the precharge command PRE when the condition of the PRE issuable state for the bank X holds. This PRE issuable time holds when TimPre[X] is less than N.

A command is issued when the issuable state and the issuable time of the command as shown in FIG. 5 hold. In this case, when there are two or more commands having a same issuable time, a collision avoiding process needs to be performed which issues one command in that timing and delays another command. When a collision occurs in command issuance between READ/WRITE and ACT, the command generating section 350 in the first embodiment of the present invention issues READ/WRITE in that timing, and delays the issuance of ACT, thereby performing the collision avoiding process. When a collision occurs in command issuance between READ/WRITE and a precharge command PRE, the command generating section 350 in the first embodiment of the present invention issues READ/WRITE in that timing, and delays the issuance of the precharge command PRE, thereby performing the collision avoiding process.

[Example of Updating Memory Bank Information in State Managing Section]

FIG. 6 is a list showing an example of updating memory bank information in the state managing section 340 in the first embodiment of the present invention. FIG. 6 shows the register name of a register to be updated in a left column, a condition for updating the register in a central column, and description of the update in a right column.

An "issuance time" in the column showing the update contents is a value indicating order of time of alignment in the synchronizing selector block 220 of commands generated simultaneously in the command generating section 350. This issuance time is a value increasing by "1" starting with "0." In addition, the value of an issuable time shown in FIG. 5 when a command is issued is set as the issuance time. A command whose issuance time indicates "0" is supplied from a signal line from which the command is in the forefront when aligned in the synchronizing selector block 220. A command whose issuance time indicates "1" is supplied from a signal line from which the command is aligned next to the command whose issuance time indicates "0" in the synchronizing selector block 220. This issuance time has a maximum number "N−1" when the command generating section 350 can simultaneously generate N commands, and indicates the order of time when the N commands are aligned in the synchronizing selector block 220, where N denotes a maximum number of commands that can be generated simultaneously in the command generating section 350. In the memory controlling device 100 shown in FIG. 1, a command whose issuance time indicates "0" is supplied as a first command via the signal line 359, and a command whose issuance time indicates "1" is supplied as a second command via the signal line 358. That is, when generating a plurality of commands in a same cycle, the command generating section 350 supplies the commands to the command synchronizing and outputting section 500 such that a command whose issuable time is a small numerical value is disposed first.

Incidentally, tRRD shown in the column showing the update contents is a value obtained by counting a minimum interval from ACT to ACT of a different bank as a number of cycles of the memory clock. tRC is a value obtained by counting a minimum interval from ACT to ACT of the same bank as a number of cycles of the memory clock. tRPD is a value obtained by counting a minimum interval from READ to a precharge command PRE of the same bank as a number of cycles of the memory clock. tRP is a value obtained by counting a minimum interval from a precharge command PRE to ACT of the same bank as a number of cycles of the memory clock. tRCD is a value obtained by counting a minimum interval from ACT to READ/WRITE of the same bank as a number of cycles of the memory clock. tRAS is a value obtained by counting a minimum interval from ACT to a precharge command PRE of the same bank as a number of cycles of the memory clock. tWL is a value obtained by counting a minimum interval from WRITE to a start of WRITE data as a number of cycles of the memory clock. tWR is a value obtained by counting a minimum interval from WRITE to a precharge command PRE of the same bank as a number of cycles of the memory clock. tWTR is a value obtained by counting a minimum interval from an end of WRITE data to READ of the same bank as a number of cycles of the memory clock. tRWD is a value obtained by counting a minimum interval from READ to WRITE of the same bank (number of cycles excluding a period of a READ data transfer) as a number of cycles of the memory clock. BL/2 is a value obtained by dividing the burst length (BL) by 2. MAX (BL/2, tRPD) is a larger value of BL/2 and tRPD. RasRegRow is the value of a row address in an R-request. CasReqLng is the value of data length in a C-request.

ActFlg[RasRegBnk] is updated to "1" indicating the Active state when ACT of RasReqBnk is issued from the command generating section 350.

ActFlg[CasReqBnk] is updated to "0" indicating the Idle state when READA or WRITEA of CasReqBnk is issued from the command generating section 350.

ActFlg[X] is updated to "0" when the precharge command PRE for the bank X where the PRE issuable state and the PRE issuable time hold is issued from the command generating section 350.

ActRow[RasReqBnk] is updated to [RasReqRow] when ACT of RasReqBnk is issued from the command generating section 350.

ActRow[X] is updated to invalid designation indicating that there is no designated row address when the precharge command PRE for the bank X where the PRE issuable state and the PRE issuable time hold is issued from the command generating section 350.

"1" is added to ActCnt[RasReqBnk] when ACT of RasReqBnk is issued from the command generating section 350 or in the case of ACT nonnecessity.

"1" is subtracted from ActCnt[CasReqBnk] when READ or WRITE of CasReqBnk is issued from the command generating section 350.

TimActAll is updated to a value obtained by adding together the issuance time of ACT of RasReqBnk and tRRD when the ACT is issued from the command generating section 350.

TimAct[RasReqBnk] is updated to a value obtained by adding together the issuance time of ACT of RasReqBnk and tRC when the ACT is issued from the command generating section 350.

TimAct[CasReqBnk] is updated to a value obtained by adding together the issuance time of READA of CasReqBnk, tRPD, and tRP when the READA is issued from the command generating section 350. TimAct[CasReqBnk] is updated to a value obtained by adding together the issuance time of WRITEA of CasReqBnk, tWL, BL/2, tWR, and tRP when the WRITEA is issued from the command generating section 350.

TimAct[X] is updated to a value obtained by adding together the issuance time of a precharge command PRE for the bank X where the PRE issuable state and the PRE issuable time hold and tRP when the precharge command PRE is issued from the command generating section 350.

TimReadAll is updated to a value obtained by adding together the issuance time of READ of CasReqBnk and CasReqLng when the READ is issued from the command generating section 350. TimReadAll is updated to a value obtained by adding together the issuance time of WRITE of CasReqBnk, tWL, BL/2, and tWTR when the WRITE is issued from the command generating section 350.

TimRead[CasReqBnk] is updated to a value obtained by adding together the issuance time of ACT for issuing READ of CasReqBnk and tRCD when the ACT is issued from the command generating section 350.

TimWriteAll is updated to a value obtained by adding together the issuance time of WRITE of CasReqBnk and CasReqLng when the WRITE is issued from the command generating section 350. TimWriteAll is updated to a value obtained by adding together the issuance time of READ of CasReqBnk, BL/2, and tRWD when the READ is issued from the command generating section 350.

TimWrite[CasReqBnk] is updated to a value obtained by adding together the issuance time of ACT for issuing WRITE of CasReqBnk and tRCD when the ACT is issued from the command generating section 350.

TimPre[RasReqBnk] is updated to a value obtained by adding together the issuance time of ACT of RasReqBnk and tRAS when the ACT is issued from the command generating section 350.

TimPre[CasReqBnk] is updated to a value obtained by adding together the issuance time of READ of CasReqBnk and MAX(BL/2, tRPD) when the READ is issued from the command generating section 350. TimPre[CasReqBnk] is updated to a value obtained by adding together the issuance time of WRITE of CasReqBnk, tWL, BL/2, and tWR when the WRITE is issued from the command generating section 350.

Incidentally, a register to be updated is not updated when a retained numerical value is higher than an updated value.

Incidentally, the memory controlling device 100 may include a designation receiving section for externally controlling the values of tRRD, tRC, tRPD, tRP, tRCD, tRAS, tWL, tWR, tWTR, and tRWD to deal with characteristics of various SDRAMs 120.

[Example of Operation of Command. Determining Block]

FIG. 7 is a timing chart showing an example of operation of the command determining block 300 in the first embodiment of the present invention. With the controller clock as a common time axis of axes of abscissas, FIG. 7 shows a part of information in the signal line 329 and the signal line 339 and information in the signal line 349, the signal line 359, and the signal line 358. Suppose in this case that the SDRAM 120 is a DDR2-667 with a CL (Cas Latency) of 5. Suppose in this case that "BL" is "4," that tRRD is "4," that tRC is "20," that tRPD is "3," that tRP is "5," that tRCD is "5," that tRAS is "15," that tWL is "4," that tWR is "5," that tWTR is "3," that tRWD is "1." Incidentally, suppose in this case that the command determining block 300 generates commands of READ, WRITE, ACT, a precharge command PRE, and NOP. Incidentally, suppose in this case that when a command collision occurs between READ and WRITE and the precharge command PRE and ACT, READ and WRITE are generated preferentially.

Suppose that the request generating section 310 generates the following 14 memory requests and supplies the generated memory requests to the R-request queue 320 and the C-request queue 330 while maintaining the order of the memory requests. The meanings of the memory requests are (an opcode, a bank number, a row address, a column address, data length represented as a number of cycles of the memory clock) in the memory requests.

Suppose that the first input memory request is (READ, 0, 37bf, 048, 2), that the second input memory request is (READ, 0, 37bf, 04c, 2), that the third input memory request is (READ, 1, 37bf, 048, 2), and that the fourth input memory request is (READ, 1, 37bf, 04c, 2). Next, suppose that the fifth input memory request is (READ, 2, 37bf, 048, 2), that the sixth input memory request is (READ, 2, 37bf, 04c, 2), that the seventh input memory request is (READ, 3, 37bf, 048, 2), and that the eighth input memory request is (READ, 3, 37bf, 04c, 2). Further, suppose that the ninth input memory request is (WRITE, 0, 26ae, 068, 2), that the tenth input memory request is (WRITE, 0, 26ae, 06c, 2), that the eleventh input memory request is (WRITE, 1, 26ae, 068, 2), and that the twelfth input memory request is (WRITE, 1, 26ae, 06c, 2). Next, suppose that the thirteenth input memory request is (WRITE, 2, 26ae, 068, 2), that the fourteenth input memory request is (WRITE, 2, 26ae, 06c, 2), that the fifteenth input memory request is (WRITE, 3, 26ae, 068, 2), and that the sixteenth input memory request is (WRITE, 3, 26ae, 06c, 2).

R-requests referred to by the command generating section 350 are shown in the signal line 329. The R-request queue 320 retains the opcodes, the bank numbers, and the row addresses shown in FIG. 2 in the input memory requests as row selecting information. RasReqOpc denotes an opcode in an R-request as oldest row selecting information in input order. RasReqBnk denotes a bank number in the R-request. RasRegRow denotes a row address in the R-request.

C-requests referred to by the command generating section 350 are shown in the signal line 339. The C-request queue 330 retains the opcodes, the bank numbers, the column addresses, and the data length shown in FIG. 2 in the input memory requests as column selecting information. CasReqOpc denotes an opcode in a C-request as oldest column selecting information in input order. CasReqBnk denotes a bank number in the C-request. CasReqClm denotes a column address in the C-request. CasReqLng denotes data length in the C-request by a number of cycles of the memory clock.

Information related to a bank [0] which information is included in the memory bank information supplied from the state managing section 340 to the command generating section 350 is shown in the signal line 349. Registers retaining each piece of information in the memory bank information are similar to those shown in FIGS. 4 to 6, and therefore description thereof will be omitted in the following. Incidentally, while only the timing chart of the bank [0] is shown here, information for other bands is also supplied from the state managing section 340 to the command generating section 350.

Opcodes and bank numbers in first commands supplied from the command generating section 350 to the first command outputting portion 510 are shown in the signal line 359. Incidentally, blank boxes in the signal line 359 represent NOP, which is a command designating no operation.

Opcodes and bank numbers in second commands supplied from the command generating section 350 to the second command outputting portion 520 are shown in the signal line 358. Incidentally, blank boxes in the timing chart shown by the signal line 358 represent NOP, which is a command designating no operation.

The interpretation of the timing chart will be described in the following with attention directed to "T=0" and "T=1" in the controller clock.

First, "T=0" will be described. The information of an R-request including information of a first memory request is output from the R-request queue 320 to the command generating section 350 via the signal line 329. The information of a C-request including information of the first memory request is output from the C-request queue 330 to the command generating section 350 via the signal line 339. Further, memory bank information is output from the state managing section 340 to the command generating section 350 via the signal line 349. Specifically, READ as RasReqOpc, "0" as RasReqBnk, and "37bf" as RasReqRow are input to the command generating section 350 via the signal line 329. Further, "READ" as CasReqOpc, "0" as CasReqBnk, "048" as CasReqClm, and "2" as CasReqLng are input to the command generating section 350 via the signal line 339. Further, "0" as ActFlg[0], invalid designation (indicated by "-" in FIG. 7) as ActRow[0], and [0] as ActCnt[0], which are information on the bank [0] in the memory bank information input via the signal line 349, are input to the command generating section 350. Further, "0" as TimActAll, "0" as TimAct[0], "0" as TimReadAll, "0" as TimRead[0], "0" as TimWriteAll, "0" as TimWrite[0], and "0" as TimPre[0] are input.

The command generating section 350 supplied with the above information makes determination as to judgment conditions for command generation as shown in FIG. 5. Then, when both conditions of an issuable state and an issuable time hold, the command generating section 350 issues the command via a signal line for supplying the command at the issuable time of the issued command. At "T=0," the ACT issuable state holds because ActFlg[0] is [0]. The ACT issuable time holds because TimActAll is [0] and TimAct[0] is [0]. The ACT nonnecessity does not hold because ActFlg[0] is [0]. The READ issuable state does not hold because ActFlg[0] is [0]. In addition, the PRE issuable state does not hold for all banks because ActFlg of all the banks is [0].

On the basis of these judgments, the command generating section 350 determines that ACT for the first memory request is issuable via the signal line 359 because the issuance time is [0] and that READ for the first memory request is not issuable. Further, the command generating section 350 determines that there is no bank to which to issue a precharge command PRE. The command generating section 350 thus generates ACT for setting the row address "37bf" in the bank [0] in the bank active state as well as NOP. Then, the command generating section 350 supplies ACT from the signal line 359, and supplies NOP from the signal line 358.

Because the command generating section 350 has issued ACT, the command generating section 350 extracts and deletes an R-request from the R-request queue 320. Because the command generating section 350 has not issued READ, the command generating section 350 leaves a C-request in the C-request queue 330 as it is. The command generating section 350 supplies information indicating that ACT for specifying the bank [0] has been issued to the state managing section 340 via the signal line 357. The state managing section 340 updates registers as shown in FIG. 6 on the basis of the information indicating that ACT for specifying the bank [0] has been issued. Because ACT for specifying the bank [0] has been issued, ActFlg[0] is updated to "1." ActRow[0] is updated to "37bf" because ACT for specifying the bank [0] has been issued. Because ACT for specifying the bank [0] has been issued, ActCnt[0] is updated to "1" by adding "1" to ActCnt[0].

Because ACT for one of the banks has been issued, TimActAll is updated to "4," which is a value obtained by adding together the issuance time (0) of the ACT and tRRD (4). Because ACT specifying the bank [0] has been issued, TimAct[0] is updated to "20," which is a value obtained by adding together the issuance time (0) of the ACT and tRC (20). TimReadAll is not updated because the condition does not hold. Because ACT for issuing READ specifying the bank [0] has been issued, TimRead[0] is updated to "5," which is a value obtained by adding together the issuance time (0) of the ACT and tRCD (5). TimWriteAll is not updated because the condition does not hold. TimWrite[0] is not updated because the condition does not hold. Because ACT specifying the bank [0] has been issued, TimPre[0] is updated to "15," which is a value obtained by adding together the issuance time (0) of the ACT and tRAS (15).

Then, in the period of the cycle of "T=0," the state managing section 340 subtracts "2," which is a number of cycles of the memory clock progressing during the period, from the values of the registers indicating waiting time information of the memory bank information. Thereby, TimActAll is updated from "4" to "2." TimAct[0] is updated from "20" to "18." TimRead[0] is updated from "5" to "3." TimPre[0] is updated from [15] to [13]. TimReadAll, TimWriteAll, and TimWrite[0] are [0], and thus remain [0].

Next, "T=1" will be described. In the R-request queue 320, the row selecting information including information of the first memory request has been removed in "T=0," and therefore row selecting information including information of the second memory request becomes an R-request. In the C-request queue 330, the column selecting information including information of the first memory request is retained as it is, and therefore the column selecting information including information of the first memory request becomes a C-request as in "T=0." Specifically, "READ" as RasReqOpc, "0" as RasReqBnk, and "37bf" as RasReqRow are input to the command generating section 350 via the signal line 329. Further, "READ" as CasReqOpc, "0" as CasReqBnk, "048" as CasReqClm, and "2" as CasReqLng are input to the command generating section 350 via the signal line 339.

Further, the memory bank information updated in "T=0" is output from the state managing section 340 to the command generating section 350 via the signal line 349. That is, "1" as ActFlg[0], "37bf" as ActRow[0], and [1] as ActCnt[0] are input. Further, "2" as TimActAll, "18" as TimAct[0], "0" as TimReadAll, "3" as TimRead[0], "0" as TimWriteAll, "0" as TimWrite[0], and "15" as TimPre[0] are input.

The command generating section 350 supplied with the above information makes determination as to judgment conditions for command generation as shown in FIG. 5. The ACT issuable state does not hold because ActFlg[0] is [1]. The ACT nonnecessity holds because ActFlg[0] is [1] and RasReqRow and ActRow[0] are the same, that is, "37bf." The READ issuable state holds because ActFlg[0] is [1] and ActCnt[0] is [1]. The PRE issuable state does not hold because for the bank [0], ActFlg[0] is [1] but ActCnt[0] is [1]. The PRE issuable state does not hold for the other banks either. On the basis of these judgments, the command generating section 350 determines that ACT for the second memory request does not need to be issued, that READ for the first memory request is not issuable, and that there is no bank to which to issue a precharge command PRE. Thus, the command generating section 350 supplies NOP from the signal line 359, and supplies NOP from the signal line 358.

Because of the ACT nonnecessity, the command generating section 350 extracts and deletes an R-request from the R-request queue 320. Because the command generating section 350 has not issued READ, the command generating section 350 leaves the C-request in the C-request queue 330 as it is.

The command generating section 350 supplies information indicating that ACT specifying the bank [0] is set to the ACT nonnecessity to the state managing section 340 via the signal line 357. The state managing section 340 updates registers as shown in FIG. 6 on the basis of the information indicating that ACT for specifying the bank [0] is set to the ACT nonnecessity. Specifically, because ACT specifying the bank [0] does not need to be issued, ActCnt[0] is updated to "2" by adding "1" to ActCnt[0].

In the period of the cycle of "T=1," the state managing section 340 subtracts "2," which is a number of cycles of the memory clock progressing during the period, from the values of the registers indicating waiting time information of the memory bank information. Thereby, TimActAll is updated from "2" to "0." TimAct[0] is updated from "18" to "16." TimRead[0] is updated from "3" to "1." TimPre[0] is updated from [13] to [11].

Thus, the command generating section 350 generates commands on the basis of the R-requests input from the R-request queue 320, the C-requests input from the C-request queue 330, and the memory bank information input from the state managing section 340.

[Example of Operation of Command Generating Section]

Next, the operation of the command generating section 350 in the first embodiment of the present invention will be described with reference to the following diagram. In the following, the operations of the command generating section 350 which operations correspond to the cycles of T=0 to T=3, T=7, T=8, T=10, and T=13 in the timing chart of FIG. 7 are shown. Incidentally, for convenience, NOP supplied by the command generating section 350 is not shown in the signal line. Incidentally, an operation of extracting (POP) and thereby erasing an R-request and a C-request from the R-request queue 320 and the C-request queue 330 by the command generating section 350 is schematically shown by broken lines separate from the signal lines 329 and 339.

FIGS. 8A to 8C are schematic diagrams showing operations of the command generating section 350 which operations correspond to the cycles of T=0 to T=2, respectively.

FIG. 8A is a diagram showing the operation of the command generating section 350 in "T=0" in FIG. 7. The command generating section 350 makes the R-request queue 320 and the C-request queue 330 output the R-request and the C-request including information of the first memory request shown in FIG. 7 via the signal line 329 and the signal line 339. Further, the command generating section 350 makes the state managing section 340 output memory bank information via the signal line 349. Then, the command generating section 350 determines the issuable conditions and issuable times of ACT, READ, and the precharge command PRE. As a result, the command generating section 350 determines that ACT based on the R-request is issuable via the signal line 359 because the issuance time is "0," that READ based on the C-request is not issuable, and that the precharge command PRE is not issuable to any bank. Thus, the command generating section 350 generates ACT for setting the row address "37bf" in the bank [0] in the bank active state as well as NOP. Then, the command generating section 350 supplies ACT from the signal line 359, and supplies NOP from the signal line 358.

The command generating section 350 thereafter supplies information indicating that ACT specifying the bank [0] has been issued to the state managing section 340 via the signal line 357.

Because the command generating section 350 has issued ACT, the command generating section 350 deletes the R-request by extracting the R-request from the R-request queue 320 via the signal line 329. Thereby, in the R-request queue 320, the row selecting information including information of the second memory request becomes an R-request.

FIG. 8B is a diagram showing the operation of the command generating section 350 in "T=1" in FIG. 7. In "T=1," the command generating section 350 makes the R-request queue 320 output the R-request including information of the second memory request and makes the C-request queue 330 output the C-request including information of the first memory request. Further, the command generating section 350 makes the state managing section 340 output memory bank information via the signal line 349. Then, the command generating section 350 determines the issuable conditions and issuable times of commands. As a result, the command generating section 350 determines that ACT based on the R-request does not need to be issued, that READ based on the C-request is not issuable, and that the precharge command PRE is not issuable to any bank. Thus, the command generating section 350 supplies NOP from the signal line 359, and supplies NOP also from the signal line 358.

The command generating section 350 thereafter supplies information indicating that ACT specifying the bank [0] does not need to be issued to the state managing section 340 via the signal line 357.

Because the command generating section 350 has determined that ACT does not need to be issued, the command generating section 350 deletes the R-request by extracting the R-request from the R-request queue 320 via the signal line 329. Thereby, in the R-request queue 320, the row selecting information including information of the third memory request becomes an R-request.

FIG. 8C is a diagram showing the operation of the command generating section 350 in "T=2" in FIG. 7. In "T=2," the command generating section 350 makes the R-request queue 320 output the R-request including information of the third memory request and makes the C-request queue 330 output the C-request including information of the first memory request. Further, the command generating section 350 makes the state managing section 340 output memory bank information via the signal line 349. Then, the command generating section 350 determines the issuable conditions and issuable times of commands. As a result, the command generating section 350 determines that ACT based on the R-request is issuable via the signal line 359 because the issuance time is "0," and that READ based on the C-request is issuable via the signal line 358 because the issuance time is "1." Further, the command generating section 350 determines that the precharge command PRE is not issuable to any bank. Thus, the command generating section 350 generates ACT for setting the row address "37bf" in the bank [1] in the bank active state and READ for specifying the column address "048" in the bank [0] and setting the column address "048" in the bank [0] in a read state. Then, the command generating section 350 supplies ACT from the signal line 359, and supplies READ from the signal line 358.

The command generating section 350 thereafter supplies information indicating that ACT specifying the bank [1] and READ specifying the bank [0] have been issued to the state managing section 340 via the signal line 357.

Because the command generating section 350 has issued ACT, the command generating section 350 deletes the R-request by extracting the R-request from the R-request queue 320 via the signal line 329. Thereby, in the R-request queue 320, the row selecting information including information of the fourth memory request becomes an R-request. Because the command generating section 350 has issued READ, the command generating section 350 deletes the C-request by extracting the C-request from the C-request queue 330 via the signal line 339. Thereby, in the C-request queue 330, the column selecting information including information of the second memory request becomes a C-request.

Figure 9A:
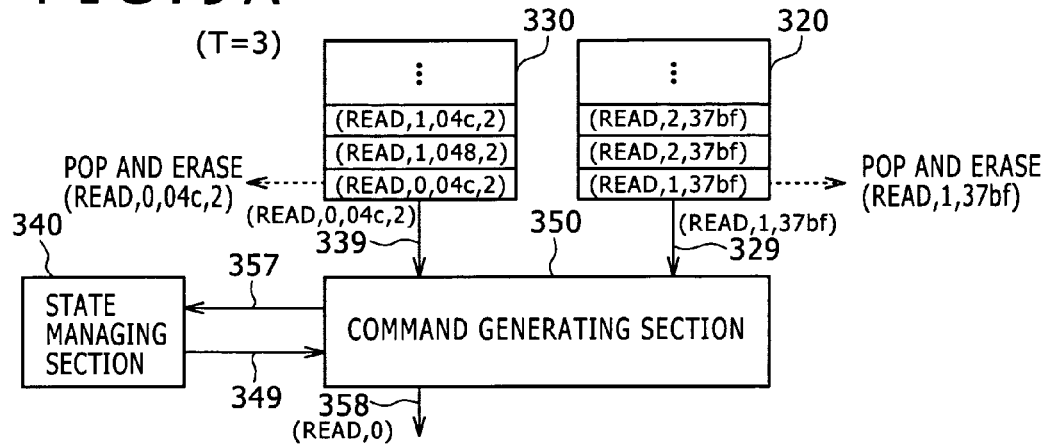
FIGS. 9A, 9B, and 9C are schematic diagrams showing operations of the command generating section which operations correspond to cycles of T=3, T=7, T=8, respectively.
Figure 9B:
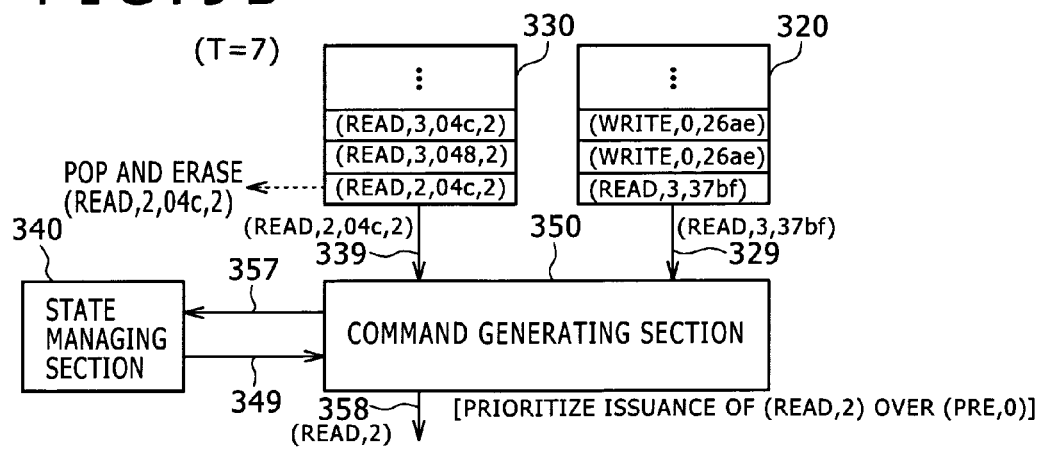
Figure 9C:
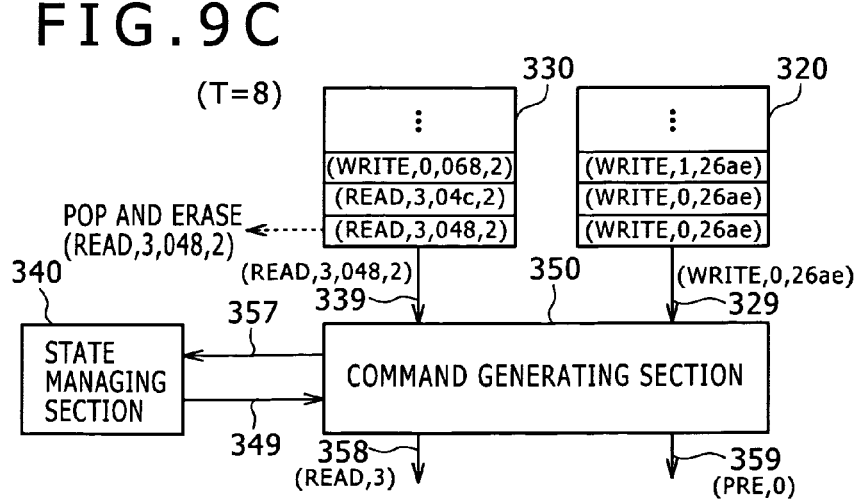

FIGS. 9A to 9C are schematic diagrams showing operations of the command generating section 350 which operations correspond to the cycles of T=3, T=7, T=8, respectively.

FIG. 9A is a diagram showing the operation of the command generating section 350 in "T=3" in FIG. 7. In "T=3," the command generating section 350 makes the R-request queue 320 output the R-request including information of the fourth memory request and makes the C-request queue 330 output the C-request including information of the second memory request. Further, the command generating section 350 makes the state managing section 340 output memory bank information via the signal line 349. Then, the command generating section 350 determines the issuable conditions and issuable times of commands. As a result, the command generating section 350 determines that ACT based on the R-request does not need to be issued, that READ based on the C-request is issuable via the signal line 358 because the issuance time is "1," and that the precharge command PRE is not issuable to any bank. Thus, the command generating section 350 generates READ for specifying the column address "04c" in the bank [0] and setting the column address "04c" in the bank [0] in the read state as well as NOP. Then, the command generating section 350 supplies NOP from the signal line 359, and supplies READ from the signal line 358.

The command generating section 350 thereafter supplies information indicating that ACT specifying the bank [1] does not need to be issued and that READ specifying the bank [0] has been issued to the state managing section 340 via the signal line 357.

Because ACT does not need to be issued, the command generating section 350 deletes the R-request by extracting the R-request from the R-request queue 320 via the signal line 329. Thereby, in the R-request queue 320, the row selecting information including information of the fifth memory request becomes an R-request. Because the command generating section 350 has issued READ, the command generating section 350 deletes the C-request by extracting the C-request from the C-request queue 330 via the signal line 339. Thereby, in the C-request queue 330, the column selecting information including information of the third memory request becomes a C-request.

FIG. 9B is a diagram showing the operation of the command generating section 350 in "T=7" in FIG. 7. In "T=7," the command generating section 350 makes the R-request queue 320 output the R-request including information of the eighth memory request and makes the C-request queue 330 output the C-request including information of the sixth memory request. Further, the command generating section 350 makes the state managing section 340 output memory bank information via the signal line 349. Then, the command generating section 350 determines the issuable conditions and issuable times of commands. As a result, the command generating section 350 determines that ACT based on the R-request does not need to be issued, and that READ based on the C-request is issuable via the signal line 358 because the issuance time is "1." Further, the command generating section 350 determines that the precharge command PRE is issuable via the signal line 358 for the bank [0] because the issuance time is "1," and determines that the precharge command PRE is not issuable to the other banks.

The command generating section 350 makes a collision avoiding determination because READ based on the C-request and the precharge command PRE specifying the bank [0] collide with each other. The command generating section 350 in FIG. 7 determines that READ is to be issued at the issuance time "1" in "T=7" because the command generating section 350 is set to give priority to READ when a collision occurs between READ and the precharge command PRE. On the basis of this result, the command generating section 350 generates READ for specifying the column address "04c" in the bank [2] and setting the column address "04c" in the bank [2] in the read state as well as NOP. Then, the command generating section 350 supplies NOP from the signal line 359, and supplies READ from the signal line 358.

The command generating section 350 thereafter supplies information indicating that READ specifying the bank [2] has been issued to the state managing section 340 via the signal line 357.

Because the command generating section 350 has issued READ, the command generating section 350 deletes the C-request by extracting the C-request from the C-request queue 330 via the signal line 339. Thereby, in the C-request queue 330, the column selecting information including information of the seventh memory request becomes a C-request.

FIG. 9C is a diagram showing the operation of the command generating section 350 in "T=8" in FIG. 7. In "T=8," the command generating section 350 makes the R-request queue 320 output the R-request including information of the ninth memory request and makes the C-request queue 330 output the C-request including information of the seventh memory request. Further, the command generating section 350 makes the state managing section 340 output memory bank information via the signal line 349. Then, the command generating section 350 determines the issuable conditions and issuable times of commands. As a result, the command generating section 350 determines that ACT based on the R-request is not issuable, and that READ based on the C-request is issuable via the signal line 358 because the issuance time is "1." Further, the command generating section 350 determines that the precharge command PRE is issuable via the signal line 359 for the bank [0] because the issuance time is "0," and that the precharge command PRE is not issuable for the other banks. Thus, the command generating section 350 generates READ for specifying the column address "04c" in the bank [3] and setting the column address "04c" in the bank [3] in the read state and the precharge command PRE specifying the bank [0]. Then, the command generating section 350 supplies the precharge command PRE from the signal line 359, and supplies READ from the signal line 358.

The command generating section 350 thereafter supplies information indicating that READ specifying the bank [3] and the precharge command PRE specifying the bank [0] have been issued to the state managing section 340 via the signal line 357.

Because the command generating section 350 has issued READ, the command generating section 350 deletes the C-request by extracting the C-request from the C-request queue 330 via the signal line 339. Thereby, in the C-request queue 330, the column selecting information including information of the eighth memory request becomes a C-request.

Figure 10A:
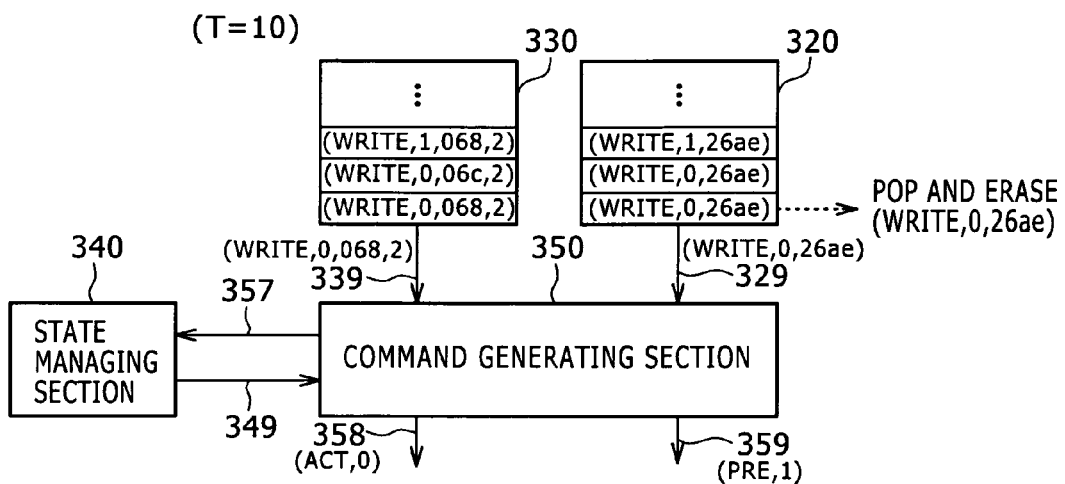
FIGS. 10A and 10B are schematic diagrams showing operations of the command generating section which operations correspond to cycles of T=10 and T=13, respectively.
Figure 10B:
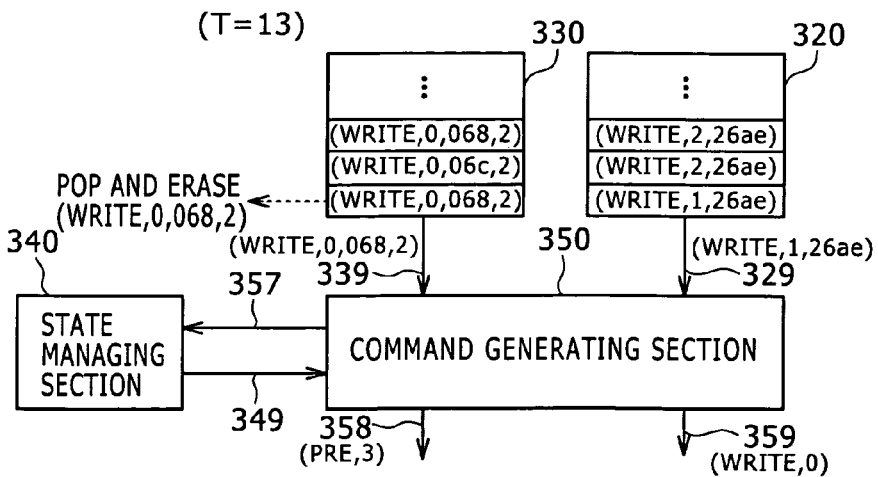

FIGS. 10A and 10B are schematic diagrams showing operations of the command generating section 350 which operations correspond to the cycles of T=10 and T=13, respectively.

FIG. 10A is a diagram showing the operation of the command generating section 350 in the cycle of "T=10" in FIG. 7. The command generating section 350 makes the R-request queue 320 output the R-request including information of the ninth memory request and makes the C-request queue 330 output the C-request including information of the ninth memory request. Further, the command generating section 350 makes the state managing section 340 output memory bank information via the signal line 349. Then, the command generating section 350 determines the issuable conditions and issuable times of commands. As a result, the command generating section 350 determines that ACT based on the R-request is issuable via the signal line 358 because the issuance time is "1," and that WRITE based on the C-request is not issuable. Further, the command generating section 350 determines that the precharge command PRE is issuable via the signal line 359 for the bank 1 because the issuance time is "0," and that the precharge command PRE is not issuable to the other banks. Thus, the command generating section 350 generates ACT for setting the row address "26ae" in the bank [0] in the bank active state and the precharge command PRE specifying the bank [1]. Then, the command generating section 350 supplies the precharge command PRE from the signal line 359, and supplies ACT from the signal line 358.

The command generating section 350 thereafter supplies information indicating that ACT specifying the bank [0] and the precharge command PRE specifying the bank [1] have been issued to the state managing section 340 via the signal line 357.

Because the command generating section 350 has issued ACT, the command generating section 350 deletes the R-request by extracting the R-request from the R-request queue 320 via the signal line 329. Thereby, in the R-request queue 320, the row selecting information including information of the tenth memory request becomes an R-request.

FIG. 10B is a diagram showing the operation of the command generating section 350 in the cycle of "T=13" in FIG. 7. The command generating section 350 makes the R-request queue 320 output the R-request including information of the twelfth memory request and makes the C-request queue 330 output the C-request including information of the ninth memory request. Further, the command generating section 350 makes the state managing section 340 output memory bank information via the signal line 349. Then, the command generating section 350 determines the issuable conditions and issuable times of commands. As a result, the command generating section 350 determines that ACT based on the R-request is not issuable and that WRITE based on the C-request is issuable via the signal line 359 because the issuance time is "0." Further, the command generating section 350 determines that the precharge command PRE is issuable via the signal line 358 for the bank [3] because the issuance time is "1," and determines that the precharge command PRE is not issuable to the other banks. Thus, the command generating section 350 generates WRITE for setting the row address "068" in the bank [0] in a write state and the precharge command PRE specifying the bank [3]. Then, the command generating section 350 supplies the precharge command PRE from the signal line 359, and supplies WRITE from the signal line 358.

The command generating section 350 thereafter supplies information indicating that WRITE specifying the bank [0] and the precharge command PRE specifying the bank [3] have been issued to the state managing section 340 via the signal line 357.

Because the command generating section 350 has issued WRITE, the command generating section 350 deletes the C-request by extracting the C-request from the C-request queue 330 via the signal line 339. Thereby, in the C-request queue 330, the column selecting information including information of the tenth memory request becomes a C-request.

[Example of Operation of Memory Controller in First Embodiment of the Present Invention]

Figure 11:
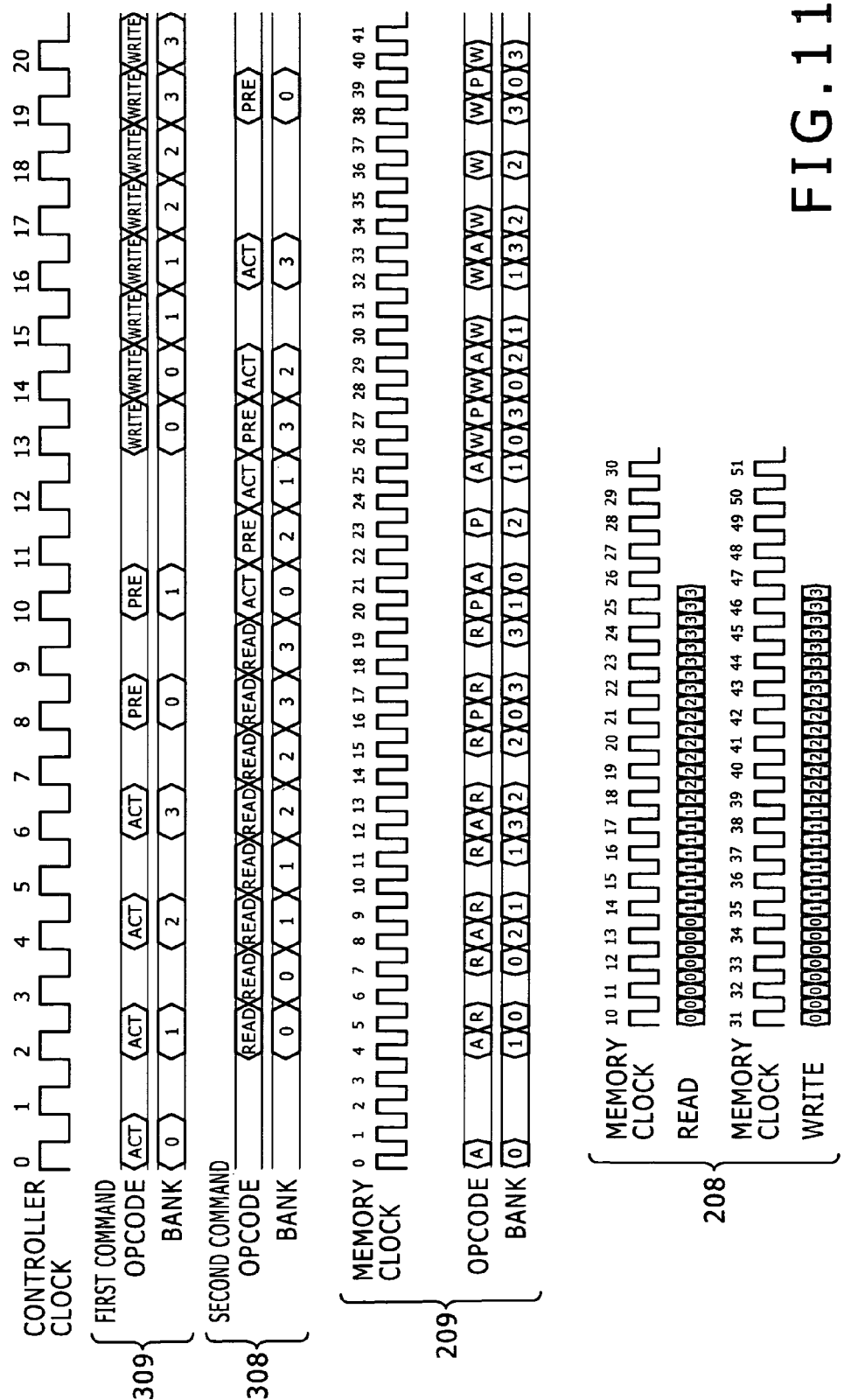
FIG. 11 is a timing chart showing an example of operation of a memory controller in the first embodiment of the present invention.

FIG. 11 is a timing chart showing an example of operation of the memory controller 200 in the first embodiment of the present invention. Suppose in this case that commands designating operation related to the SDRAM 120 are generated by the command determining block 300 shown in FIG. 7.

In the signal line 309 and the signal line 308, with the controller clock as an axis of abscissas, opcodes and bank numbers of first commands and second commands supplied from the command determining block 300 to the synchronizing selector block 220 are shown. The synchronizing selector block 220 generates commands of the same frequency as the memory clock by alternately aligning the first commands and the second commands such that the first commands come first.

In the address/command bus 209, with the memory clock as an axis of abscissas, the commands of the same frequency as the memory clock which commands are generated on the basis of the commands of the signal line 309 and the signal line 308 are shown. The commands of the same frequency as the memory clock which commands are generated in the synchronizing selector block 220 are supplied to the memory interface 250 in timing synchronized with the memory clock in the memory clock command outputting block 230. Then, the commands of the same frequency as the memory clock are supplied from the memory interface 250 to the SDRAM 120 via the address/command bus 209. Incidentally, "A" shown as an opcode in the address/command bus 209 denotes "ACT," "R" shown as an opcode in the address/command bus 209 denotes "READ," "P" shown as an opcode in the address/command bus 209 denotes "PRE," and "W" shown as an opcode in the address/command bus 209 denotes "WRITE."

In the memory bus 208, with the memory clock as an axis of abscissas, data exchanged between the SDRAM 120 and the memory controller 200 is shown together with bank numbers. The SDRAM 120 makes data access via the memory bus 208 on the basis of the commands supplied via the address/command bus 209, whereby the data shown in the memory bus 208 is exchanged.

Thus, according to the first embodiment of the present invention, operation of the SDRAM 120 can be designated by generating two commands by the command generating section 350 operating at ½ of the frequency of the memory clock.

<2. Second Embodiment>

[Second Example of Configuration of Memory Controlling Device]

Figure 12:
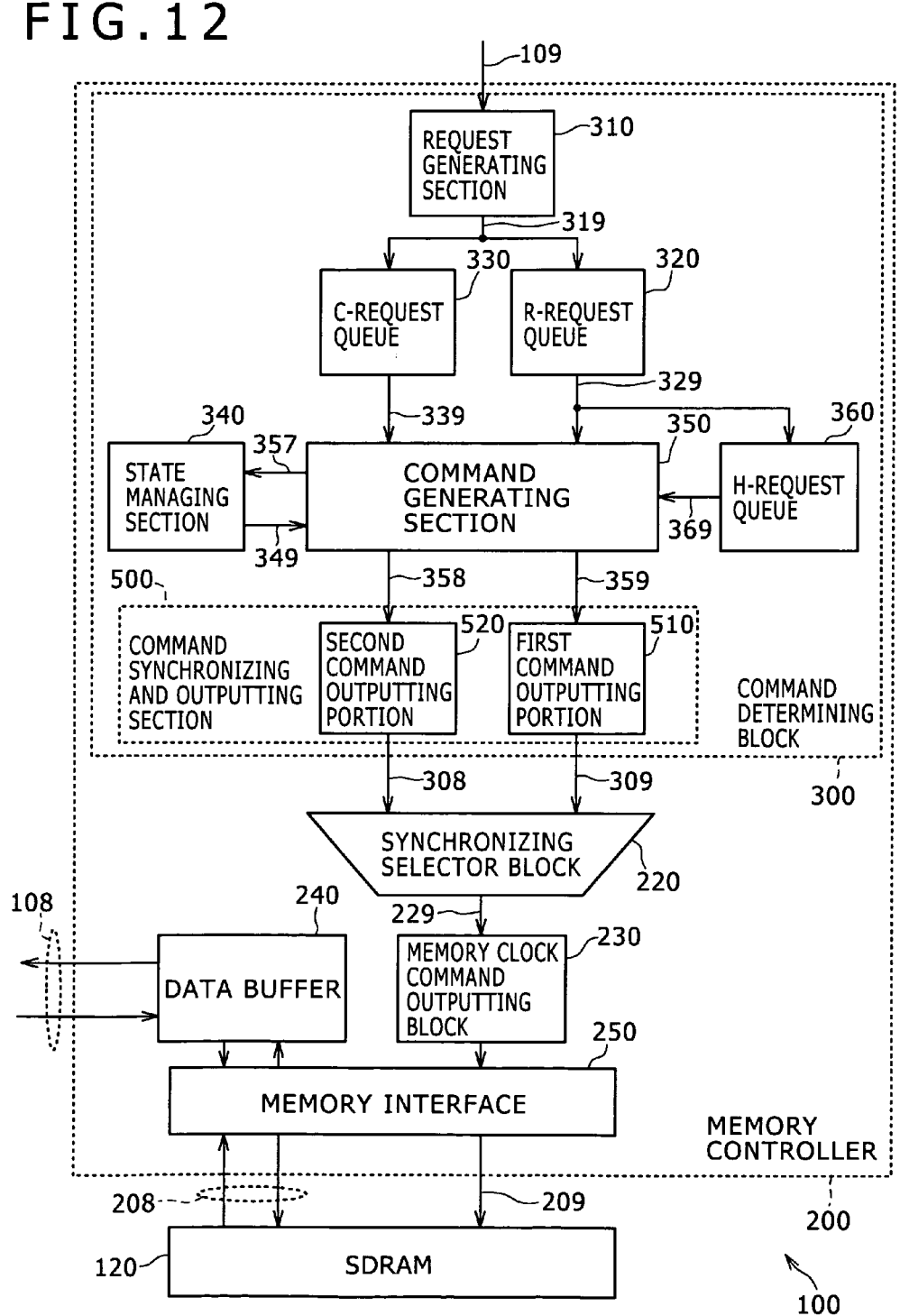
FIG. 12 is a block diagram showing an example of configuration of a memory controlling device in a second embodiment of the present invention.

FIG. 12 is a block diagram showing an example of configuration of a memory controlling device 100 in a second embodiment of the present invention. The memory controlling device 100 includes an H-request queue 360 in addition to the constitution of the memory controlling device 100 shown in FIG. 1. In this case, the constitution other than the H-request queue 360 is similar to that of FIG. 1, and therefore description of each part will be omitted in the following with each part identified by the same reference numeral as in FIG. 1.

The H-request queue 360 extracts an R-request from an R-request queue 320, and retains the extracted R-request. When a command generating section 350 waits to issue a command on the basis of an R-request, the H-request queue 360 extracts the R-request from the R-request queue 320, and retains the R-request as waiting row selecting information. The H-request queue 360 is formed by an FIFO type queue that performs first-in first-out operation. The H-request queue 360 outputs oldest waiting row selecting information of the retained waiting row selecting information to the command generating section 350 via a signal line 369 as an H-request. When a command specifying a row address is generated in the command generating section 350 on the basis of the H-request, the H-request is deleted by being extracted by the command generating section 350. Incidentally, the H-request queue 360 is an example of a waiting information retaining section described in claims.

The command generating section 350 generates a command designating operation related to an SDRAM 120 on the basis of an H-request, an R-request, a C-request, and memory bank information input via signal lines 369, 329, 339, and 349.

An example of operation of a command determining block 300 in the second embodiment of the present invention will next be described with reference to a drawing.

[Example of Operation of Command Determining Block in Second Embodiment of the Present Invention]

Figure 13A:
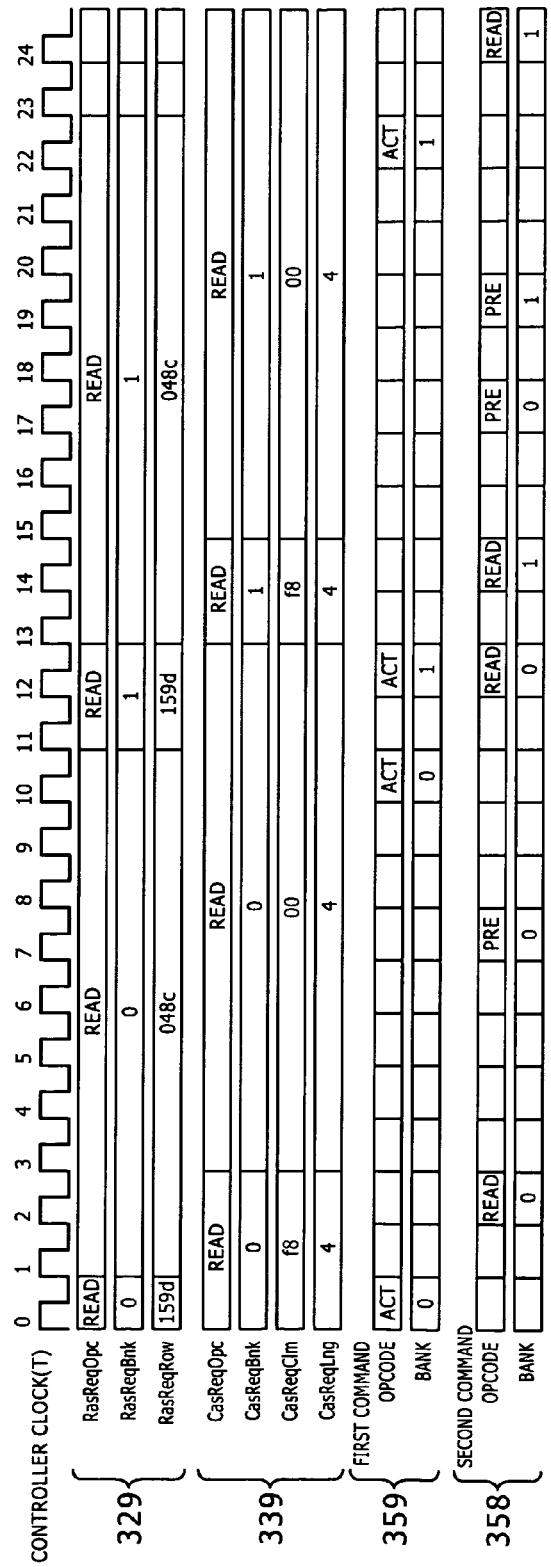
FIGS. 13A and 13B are timing charts showing examples of operations of a command determining block in the first and second embodiments, respectively, of the present invention.
Figure 13B:
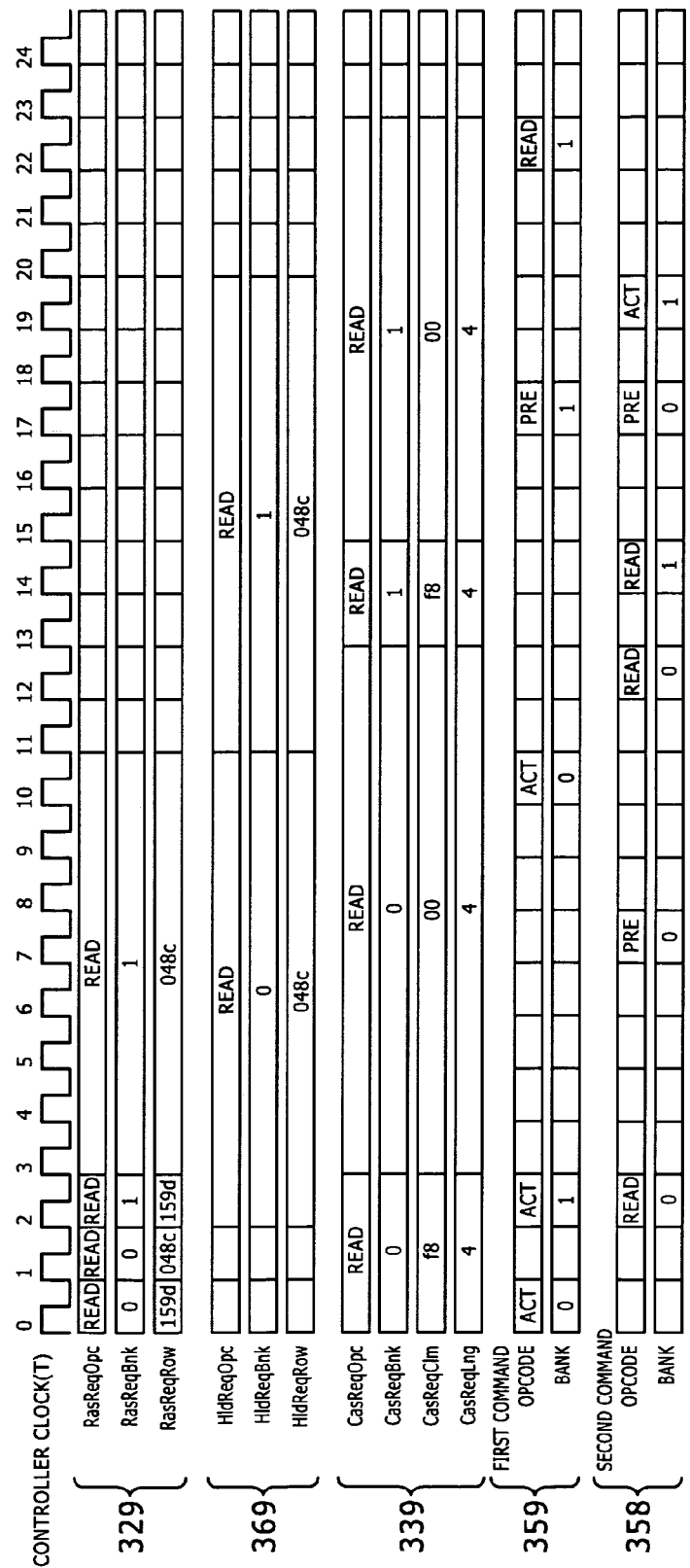

FIGS. 13A and 13B are timing charts showing examples of operations of the command determining block 300 in the first and second embodiments, respectively, of the present invention. In each of FIGS. 13A and 13B, a controller clock is used as an axis of abscissa. Incidentally, suppose in this case that "BL" is "8" and that "tRPD" is "5." In addition, suppose that the performance of the SDRAM 120 other than "tRPD" is similar to that of FIG. 7. Suppose that memory bank information is similar to that shown in FIGS. 4 to 6. Incidentally, suppose in this case that the H-request queue 360 is an FIFO type queue retaining one piece of data.

Suppose that a request generating section 310 generates the following four memory requests and supplies the generated memory requests to the R-request queue 320 and a C-request queue 330 while maintaining the order of the memory requests. Suppose that the first input memory request is (READ, 0, 159d, 0fc, 4), that the second input memory request is (READ, 0, 048c, 000, 4), that the third input memory request is (READ, 1, 159d, 0fc, 4), and that the fourth input memory request is (READ, 1, 048c, 000, 4).

FIG. 13A shows an example of operation of the command determining block 300 in the first embodiment shown in FIG. 1, the command determining block 300 generating commands on the basis of the four memory requests described above.

The first memory request and the second memory request have the same bank number of "0," but have different row addresses. The third memory request and the fourth memory request also have the same bank number of "1," but have different row addresses. Thus, ACT based on the second and fourth memory requests is not set to ACT nonnecessity. Thereby, ACT based on the second and fourth memory requests is issued after the reading of a first piece of data and a fourth piece of data is ended and after a precharge command PRE is issued.

First, ACT based on an R-request including information of the first memory request is issued from a signal line 359 in "T=0." Then, in "T=2," a first READ based on a C-request including information of the first memory request is issued from a signal line 358. Next, in "T=7," a precharge command PRE specifying the bank [0] whose operation is designated by the first READ is issued from the signal line 358.

Next, in "T=10," ACT based on an R-request including information of the second memory request is issued from a signal line 359. Then, in "T=12," ACT based on an R-request including information of the third memory request is issued from the signal line 359, and a second READ based on a C-request including information of the second memory request is supplied from the signal line 358. Then, in "T=14," a third READ based on a C-request including information of the third memory request is issued. Next, in "T=17," a precharge command PRE specifying the bank [0] whose operation is designated by the second READ is issued from the signal line 358. Next, in "T=19," a precharge command PRE specifying the bank [1] whose operation is designated by the third READ is issued from the signal line 358.

In "T=22," ACT is issued from the signal line 359 on the basis of an R-request including information of the fourth memory request. Then, in "T=24," a fourth READ based on a C-request including information of the fourth memory request is issued from the signal line 358.

FIG. 13B shows an example of operation of the command determining block 300 in the second embodiment shown in FIG. 12, the command determining block 300 generating commands on the basis of the four memory requests described above. H-requests referred to by the command generating section 350 are shown in the signal line 369. HldReqOpc denotes an opcode in an H-request. HldReqBnk denotes a bank number in the H-request. HldReqRow denotes a row address in the H-request.

The command determining block 300 in FIG. 13B includes the H-request queue 360. Thus, when the command generating section 350 waits to issue a command on the basis of an R-request, the R-request is extracted from the R-request queue 320 and retained as an H-request.

First, ACT based on an R-request including information of the first memory request is issued from the signal line 359 in "T=0."

In "T=1," because ACT based on an R-request including information of the second memory request is not set to ACT nonnecessity, the command generating section 350 waits to issue ACT based on the R-request including information of the second memory request. At this time, because the H-request queue 360 has a vacancy, the R-request including information of the second memory request is taken out from the R-request queue 320 to the H-request queue 360. Thereby, row selecting information including information of the third memory request becomes an R-request, and waiting row selecting information including information of the second memory request becomes an H-request.

In "T=2," commands are generated on the basis of the R-request including information of the third memory request, the H-request including information of the second memory request, a C-request including information of the first memory request, and memory bank information. Thus, ACT based on the R-request including information of the third memory request is issued from the signal line 359. In addition, a first READ based on the C-request including information of the first memory request is issued from the signal line 358.

In "T=7," a precharge command PRE specifying the bank [0] whose operation is designated by the first READ is issued from the signal line 358.

In "T=10," commands are generated on the basis of an R-request including information of the fourth memory request, the H-request including information of the second memory request, the C-request including information of the first memory request, and the memory bank information. Thus, ACT based on the H-request including information of the second memory request is issued from the signal line 359. Then, the H-request is extracted and deleted by the command generating section 350, and the R-request including information of the fourth memory request is extracted from the R-request queue 320 and retained by the H-request queue 360.

Then, in "T=12," a second READ based on a C-request including information of the second memory request is supplied from the signal line 358. Next, in "T=14," a third READ based on a C-request including information of the third memory request is supplied from the signal line 358. In "T=17," a precharge command PRE for the bank [1] specified by the third READ is issued from the signal line 359. Further, in "T=17," a precharge command PRE for the bank [0] specified by the second READ is issued from the signal line 358.

In "T=19," a command is generated on the basis of the H-request including information of the fourth memory request, the C-request including information of the first memory request, and the memory bank information. Thus, ACT based on the H-request including information of the fourth memory request is issued from the signal line 358. Then, in "T=22," READ based on the C-request including information of the fourth memory request is issued from the signal line 359.

Thus, the provision of the H-request queue 360 enables more efficient generation of a plurality of commands than the first embodiment of the present invention when there are consecutive memory requests having a same bank number but having different row addresses.

[Example of Operation of Command Generating Section in Second Embodiment of the Present Invention]

The operation of the command generating section 350 in the second embodiment of the present invention will next be described with reference to the following diagrams. The operation of the command generating section 350 in T=0 to T=3, T=10, and T=19 in the timing chart of FIG. 13B will be shown in the following. Incidentally, for convenience, NOP supplied by the command generating section 350 is not shown in the signal line. Incidentally, an operation of extracting (POP) and thereby erasing an R-request and a C-request from the R-request queue 320 and the C-request queue 330 by the command generating section 350 is schematically shown by broken lines separate from the signal lines 329 and 339. Incidentally, an operation of extracting (POP) and thereby erasing an H-request from the H-request queue 360 by the command generating section 350 is schematically shown by a broken line separate from the signal line 369.

Figure 14A:
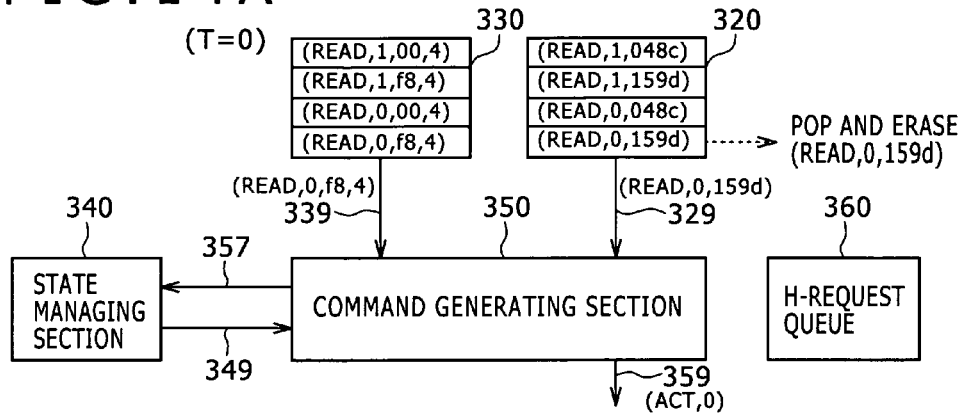
FIGS. 14A, 14B, and 14C are schematic diagrams showing operations of a command generating section in cycles of T=0 to T=2, respectively, in the second embodiment of the present invention.
Figure 14B:
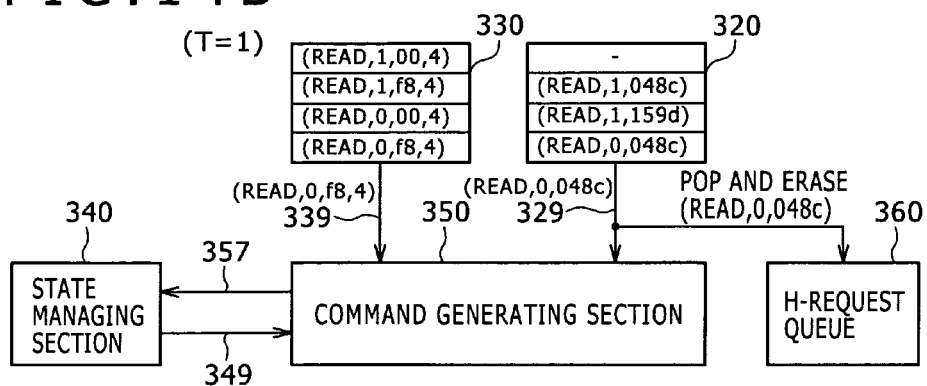
Figure 14C:
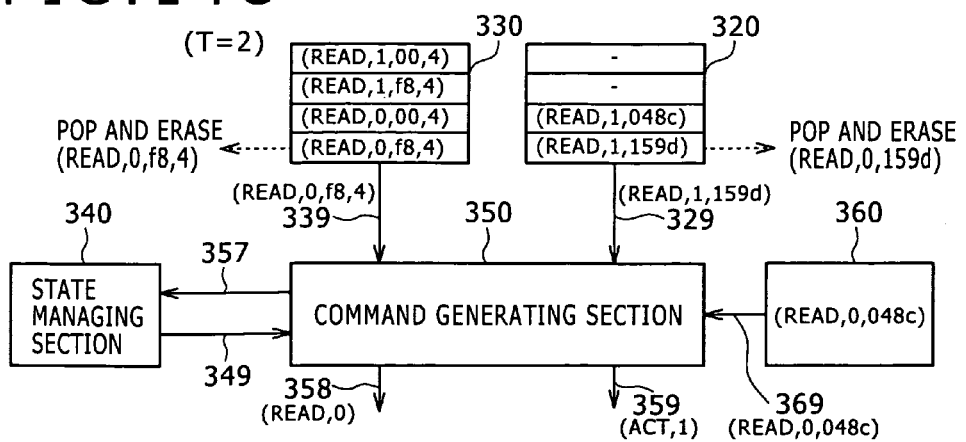

FIGS. 14A to 14C are schematic diagrams showing operations of the command generating section 350 which operations correspond to the cycles of T=0 to T=2, respectively, in the second embodiment of the present invention.

FIG. 14A is a diagram showing the operation of the command generating section 350 in "T=0" in FIG. 13B. The command generating section 350 makes the R-request queue 320 and the C-request queue 330 output the R-request and the C-request including information of the first memory request via the signal line 329 and the signal line 339. At this time, no H-request is output from the H-request queue 360 because the H-request queue 360 does not retain waiting row selecting information.

The command generating section 350 determines the issuable conditions and issuable times of commands on the basis of the R-request, the C-request, and memory bank information supplied from the state managing section 340. As a result, the command generating section 350 determines that ACT based on the R-request is issuable via the signal line 359 because the issuance time is "0," that READ based on the C-request is not issuable, and that a precharge command PRE is not issuable to any bank. Thus, the command generating section 350 generates ACT for setting the row address "159d" in the bank [0] in the bank active state as well as NOP. Then, the command generating section 350 supplies ACT from the signal line 359, and supplies NOP via the signal line 358.

The command generating section 350 thereafter supplies information indicating that ACT specifying the bank [0] has been issued to the state managing section 340 via the signal line 357.

Because the command generating section 350 has issued ACT, the command generating section 350 deletes the R-request by extracting the R-request from the R-request queue 320 via the signal line 329. Thereby, in the R-request queue 320, the row selecting information including information of the second memory request becomes an R-request.

FIG. 14B is a diagram showing the operation of the command generating section 350 in "T=1" in FIG. 13B. The command generating section 350 makes the R-request queue 320 output the R-request including information of the second memory request and makes the C-request queue 330 output the C-request including information of the first memory request. At this time, no H-request is output from the H-request queue 360 because the H-request queue 360 does not retain waiting row selecting information. The command generating section 350 determines the issuable conditions and issuable times of commands on the basis of the R-request, the C-request, and the memory bank information output from the state managing section 340. As a result, the command generating section 350 determines that ACT based on the R-request is not issuable, that READ based on the C-request is not issuable, and that the precharge command PRE is not issuable to any bank. Thus, the command generating section 350 generates two NOPs, and supplies the two NOPs from the signal line 359 and the signal line 358.

Thereafter, the command generating section 350 extracts the R-request from the R-request queue 320, and supplies the extracted R-request to the H-request queue 360. Thereby, in the R-request queue 320, the row selecting information including information of the third memory request becomes an R-request. In addition, in the H-request queue 360, waiting row selecting information including information of the second memory request becomes an H-request.

FIG. 14C is a diagram showing the operation of the command generating section 350 in "T=2" in FIG. 13B. The command generating section 350 makes the R-request queue 320 output the R-request including information of the third memory request and makes the C-request queue 330 output the C-request including information of the first memory request. Further, the command generating section 350 makes the H-request queue 360 output the H-request including information of the second memory request. The command generating section 350 determines the issuable conditions and issuable times of commands on the basis of the R-request, the C-request, the H-request, and the memory bank information supplied from the state managing section 340. As a result, the command generating section 350 determines that ACT based on the R-request is issuable via the signal line 359 because the issuance time is "0," and that READ based on the C-request is issuable via the signal line 358 because the issuance time is "1." Further, the command generating section 350 determines that ACT based on the H-request is not issuable, and that the precharge command PRE is not issuable to any bank. Thus, the command generating section 350 generates ACT for setting the row address "159d" in the bank [1] in the bank active state and READ for specifying the column address "f8" in the bank [0] and setting the column address "f8" in the bank [0] in the read state. Then, the command generating section 350 supplies ACT from the signal line 359, and supplies READ from the signal line 358.

The command generating section 350 thereafter supplies information indicating that ACT specifying the bank [1] and READ specifying the bank [0] have been issued to the state managing section 340 via the signal line 357.

Because the command generating section 350 has issued ACT on the basis of the R-request, the command generating section 350 deletes the R-request by extracting the R-request from the R-request queue 320 via the signal line 329. Thereby, in the R-request queue 320, the row selecting information including information of the fourth memory request becomes an R-request: Because the command generating section 350 has issued READ, the command generating section 350 deletes the C-request by extracting the C-request from the C-request queue 330 via the signal line 339.

Thereby, in the C-request queue 330, the column selecting information including information of the second memory request becomes a C-request.

Figure 15A:
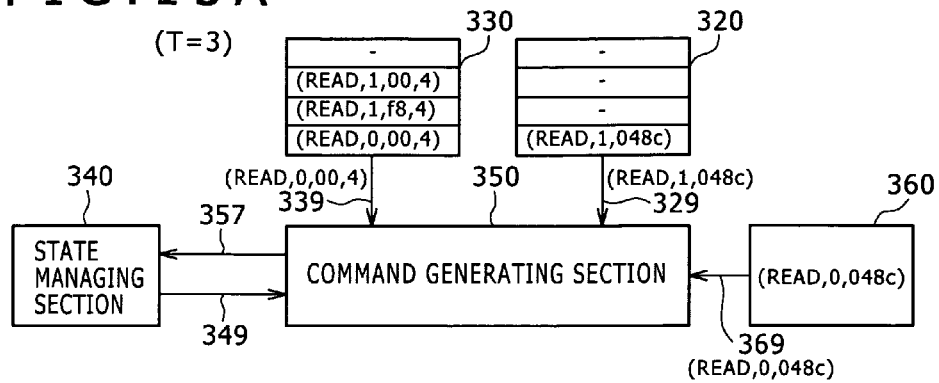
FIGS. 15A, 15B, and 15C are schematic diagrams showing operations of the command generating section in cycles of T=3, T=10, T=19, respectively, in the second embodiment of the present invention.
Figure 15B:
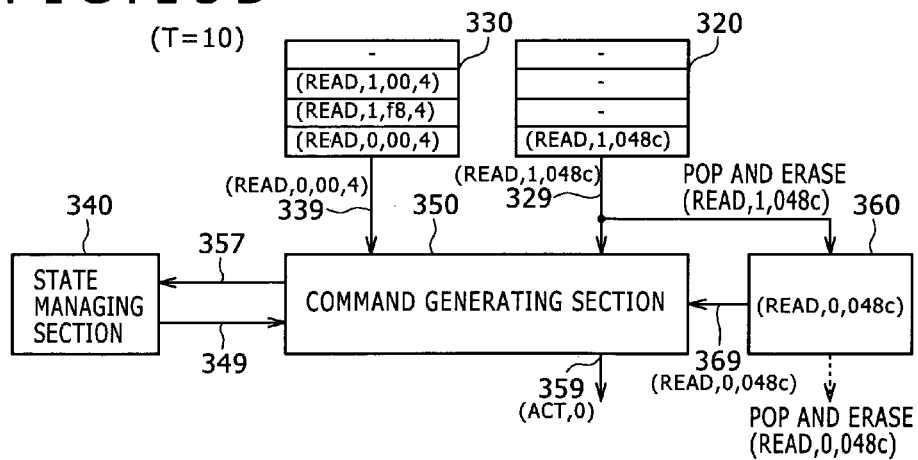
Figure 15C:
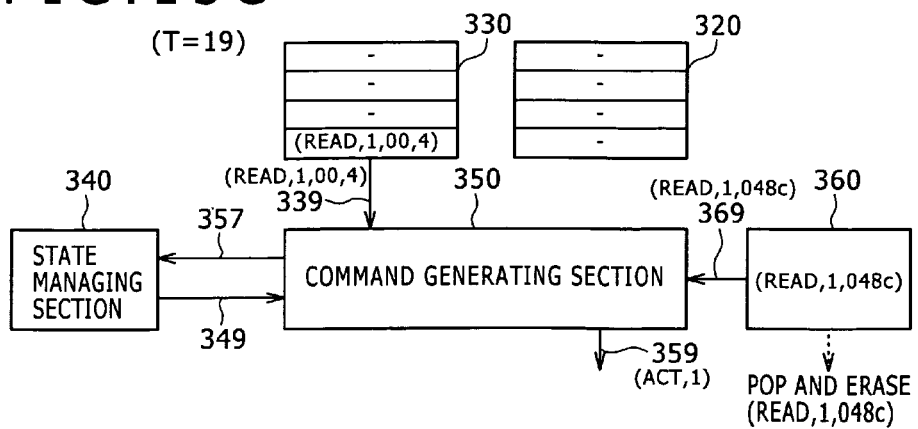

FIGS. 15A to 15C are schematic diagrams showing operations of the command generating section 350 which operations correspond to the cycles of T=3, T=10, T=19, respectively, in the second embodiment of the present invention.

FIG. 15A is a diagram showing the operation of the command generating section 350 in "T=3" in FIG. 13B. The command generating section 350 makes the R-request queue 320 output the R-request including information of the fourth memory request and makes the C-request queue 330 output the C-request including information of the second memory request. Further, the command generating section 350 makes the H-request queue 360 output the H-request including information of the second memory request. The command generating section 350 determines the issuable conditions and issuable times of commands on the basis of the R-request, the C-request, the H-request, and the memory bank information supplied from the state managing section 340. As a result, the command generating section 350 determines that ACT based on the R-request is not issuable, and that READ based on the C-request is not issuable. Further, the command generating section 350 determines that ACT based on the H-request is not issuable, and that the precharge command PRE is not issuable to any bank. Thus, the command generating section 350 generates two NOPs, and supplies the two NOPs from the signal line 359 and the signal line 358.

The command generating section 350 thereafter does not transfer the R-request to the H-request queue 360 because the H-request queue 360 has no vacancy. Thereby, in the R-request queue 320, the row selecting information including information of the third memory request remains an R-request. In addition, in the H-request queue 360, waiting row selecting information including information of the second memory request remains an H-request.

FIG. 15B is a diagram showing the operation of the command generating section 350 in "T=10" in FIG. 13B. The command generating section 350 makes the R-request queue 320 output the R-request including information of the fourth memory request and makes the C-request queue 330 output the C-request including information of the second memory request. Further, the command generating section 350 makes the H-request queue 360 output the H-request including information of the second memory request. The command generating section 350 determines the issuable conditions and issuable times of commands on the basis of the R-request, the C-request, the H-request, and the memory bank information supplied from the state managing section 340. As a result, the command generating section 350 determines that ACT based on the R-request is not issuable, and that READ based on the C-request is not issuable. Further, the command generating section 350 determines that ACT based on the H-request is issuable via the signal line 359 because the issuance time is "0," and that the precharge command PRE is not issuable to any bank. Thus, the command generating section 350 generates ACT for setting the row address "048c" in the bank [0] in the bank active state as well as NOP. Then, the command generating section 350 supplies ACT from the signal line 359, and supplies NOP from the signal line 358.

The command generating section 350 thereafter supplies information indicating that ACT specifying the bank [0] has been issued to the state managing section 340 via the signal line 357.

Because the command generating section 350 has issued ACT on the basis of the H-request, the command generating section 350 deletes the H-request by extracting the H-request from the H-request queue 360 via the signal line 369. Thereby, the H-request queue 360 is in a vacant state in which the H-request queue 360 does not retain waiting row selecting information. Then, the command generating section 350 extracts the R-request from the R-request queue 320, and supplies the extracted R-request to the H-request queue 360. Thereby, in the H-request queue 360, the waiting row selecting information including information of the fourth memory request becomes an H-request. In addition, the R-request queue 320 is in a vacant state without row selecting information.

FIG. 15C is a diagram showing the operation of the command generating section 350 in "T=19" in FIG. 13B. The command generating section 350 makes the C-request queue 330 output the C-request including information of the fourth memory request and makes the H-request queue 360 output the H-request including information of the fourth memory request. There is no R-request to be output because the R-request queue 320 does not retain row selecting information. The command generating section 350 determines the issuable conditions and issuable times of commands on the basis of the H-request, the C-request, and the memory bank information supplied from the state managing section 340. As a result, the command generating section 350 determines that. ACT based on the H-request is issuable via the signal line 359 because the issuance time is "0," that READ based on the C-request is not issuable, and that the precharge command PRE is not issuable to any bank. Thus, the command generating section 350 generates ACT for setting the row address "048c" in the bank [1] in the bank active state as well as NOP. Then, the command generating section 350 supplies ACT from the signal line 359, and supplies NOP from the signal line 358.

The command generating section 350 thereafter supplies information indicating that ACT specifying the bank [1] has been issued to the state managing section 340 via the signal line 357.

Because the command generating section 350 has issued ACT on the basis of the H-request, the command generating section 350 deletes the H-request by extracting the H-request from the H-request queue 360 via the signal line 369. Thereby, the H-request queue 360 is in a vacant state in which the H-request queue 360 does not retain waiting row selecting information. Then, the command generating section 350 leaves the H-request queue 360 as it is in the vacant state because the R-request queue 320 has no R-request in a waiting state.

Thus, according to the second embodiment of the present invention, the provision of the H-request queue 360 enables more efficient issuance of commands when there are consecutive memory requests having a same bank number but having different row addresses.

An example of a command collision avoidance by the command generating section 350 when a plurality of commands are issuable at a same issuance time will next be described with reference to a drawing.

[Example of Command Collision Avoidance when Efficiency of Data Readout is Improved by Prioritizing Precharge Command PRE over READ and WRITE in First and Second Embodiments of the Present Invention]

FIGS. 16A, 16B, and 16C are timing charts showing an example of a command collision avoidance when efficiency of data readout is improved by avoiding command collision with priority given to a precharge command PRE in the first and second embodiments of the present invention. With the memory clock as a common axis of abscissas, FIGS. 16A to 16C show commands supplied to the SDRAM 120 via the address/command bus 209 by the memory controller 200.

FIGS. 16A to 16C further show data read according to the commands and supplied from the SDRAM 120 to the memory controller 200 via the memory bus 208.

In this case, as commands issued by the command generating section 350, a first command of READ, a second command of READ, and a third command of a precharge command PRE are assumed for the bank [0]. In this case, for the bank [1], a case is assumed in which a precharge command PRE is issued as a first command, ACT is issued as a second command, and READ is issued as a third command. Suppose that a command collision occurs between the first READ specifying the bank [0] and the first precharge command PRE specifying the bank [1]. In addition, suppose that "BL" is "8" and that "tRPD" is "5." Suppose that the performance of the SDRAM 120 other than "tRPD" is similar to that of FIG. 7.

FIG. 16A schematically shows a state before the command generating section 350 makes a command collision avoidance determination. In "T=0," READ specifying the bank [0] and the precharge command PRE specifying the bank [1] collide with each other. That is, in this state, the command generating section 350 has determined that READ specifying the bank [0] and the precharge command PRE specifying the bank [1] are issuable at a same issuance time in a same command clock cycle. The command generating section 350 cannot generate a plurality of commands at a same issuance time in a same cycle. Thus, in such a case, the command generating section 350 makes a determination for avoiding command collision according to a preset condition. Then, according to the avoidance determination, one command is issued at that issuance time in that cycle, and the other command is issued thereafter.

FIG. 16B schematically shows a case where the command generating section 350 makes a command collision avoidance determination that prioritizes READ in "T=0." Suppose in this case that a setting for prioritizing the issuance of READ and WRITE over the issuance of a precharge command PRE is made in the command generating section 350.

Of the first READ specifying the bank [0] and the precharge command PRE specifying the bank [1] which commands collide with each other, the command generating section 350 preferentially issues the first READ specifying the bank [0] in timing corresponding to "T=0." Thereby, the first READ specifying the bank [0] is issued in "T=0." Then, in "T=1," the precharge command PRE specifying the bank [1] is issued.

Thereafter, a second READ specifying the bank [0] is issued in "T=4." ACT specifying the bank [1] is issued in "T=6." A precharge command PRE specifying the bank [0] is issued in "T=9." READ specifying the bank [1] is issued in "T=11."

Consequently, data read according to the first READ specifying the bank [0] is supplied in "T=5 to T=8," and data read according to the second READ specifying the bank [0] is supplied in "T=9 to T=12." Further, data read according to READ specifying the bank [1] is supplied in "T=16 to T=19."

FIG. 16C schematically shows a case where the command generating section 350 makes a command collision avoidance determination that prioritizes the precharge command PRE in "T=0." Suppose in this case that a setting for prioritizing the issuance of a precharge command PRE over the issuance of READ and WRITE is made in the command generating section 350. Further, suppose that a setting for prioritizing the issuance of ACT over the issuance of READ and WRITE is made in the command generating section 350.

Of the first READ specifying the bank [0] and the precharge command PRE specifying the bank [1] which commands collide with each other, the command generating section 350 preferentially issues the precharge command PRE in timing corresponding to "T=0." Thereby, the precharge command PRE specifying the bank [1] is issued in "T=0." Then, in "T=1," the first READ specifying the bank [0] is issued.

Thereafter, a command collision occurs between ACT specifying the bank [1] and the second READ specifying the bank [0] in "T=5.". The command generating section 350 preferentially issues ACT specifying the bank [1] in timing corresponding to "T=5." Thereby, ACT specifying the bank [1] is issued in "T=5." Then, in "T=6," the second READ specifying the bank [0] is issued.

Thereafter, READ specifying the bank [1] is issued in "T=10." A precharge command PRE specifying the bank [0] is issued in "T=11."

Consequently, data read according to the first READ specifying the bank [0] is supplied in "T=6 to T=9," and data read according to the second READ specifying the bank [0] is supplied in "T=11 to T=14." Further, data read according to READ specifying the bank [1] is supplied in "T=15 to T=18."

Thus, in the first and second embodiments of the present invention, command collision avoidance can be achieved with high efficiency of data transfer when the precharge command PRE and ACT are prioritized over READ in a case of command collision as shown in FIG. 16A. Incidentally, while FIGS. 16A to 16C suppose a case of issuing READ, the same is true for a case of issuing WRITE. Command collision avoidance with high efficiency of data transfer can be achieved when the precharge command PRE and ACT are prioritized over WRITE.

[Example of Command Collision Avoidance when Efficiency of Data Readout is Improved by Prioritizing READ and WRITE over Precharge Command PRE in First and Second Embodiments of the Present Invention]

FIGS. 17A, 17B, and 17C are timing charts showing an example of a command collision avoidance when efficiency of data readout is improved by avoiding command collision with priority given to READ in the first and second embodiments of the present invention. With the memory clock as a common axis of abscissas, FIGS. 17A to 17C show commands supplied to the SDRAM 120 via the address/command bus 209 by the memory controller 200. FIGS. 17A to 17C further show data read according to the commands and supplied from the SDRAM 120 to the memory controller 200 via the memory bus 208.

In this case, as commands issued by the command generating section 350, a first command of READ, a second command of READ, a third command of READ, and a fourth command of a precharge command PRE are assumed for the bank [0]. In this case, for the bank [1], a case is assumed in which a precharge command PRE is issued as a first command, ACT is issued as a second command, and READ is issued as a third command. Suppose that a command collision occurs between the first READ specifying the bank [0] and the first precharge command PRE specifying the bank [1]. In addition, suppose that "BL" is "8" and that "tRPD" is "5." Suppose that the performance of the SDRAM 120 other than "tRPD" is similar to that of FIG. 7.

FIG. 17A schematically shows a state before the command generating section 350 makes a command collision avoidance determination. In "T=0," READ specifying the bank [0] and the precharge command PRE specifying the bank [1] collide with each other. That is, in this state, the command generating section 350 has determined that READ specifying the bank [0] and the precharge command PRE specifying the bank [1] are issuable at a same issuance time in a same command clock cycle. The command generating section 350 cannot generate a plurality of commands at a same issuance time in a same cycle. Thus, in such a case, the command generating section 350 makes a determination for avoiding command collision according to a preset condition. Then, according to the avoidance determination, one command is issued at that issuance time in that cycle, and the other command is issued thereafter.

FIG. 17B schematically shows a case where the command generating section 350 makes a command collision avoidance determination that prioritizes READ in "T=0." Suppose in this case that a setting for prioritizing the issuance of READ and WRITE over the issuance of a precharge command PRE is made in the command generating section 350.

Of the first READ specifying the bank [0] and the precharge command PRE specifying the bank [1] which commands collide with each other, the command generating section 350 preferentially issues the first READ specifying the bank [0] in timing corresponding to "T=0." Thereby, the first READ specifying the bank [0] is issued in "T=0." Then, in "T=1," the precharge command PRE specifying the bank [1] is issued.

Thereafter, a second READ specifying the bank [0] is issued in "T=4." ACT specifying the bank [1] is issued in "T=6." READ specifying the bank [0] is issued in "T=8." Then, READ specifying the bank [1] is issued in "T=12." A precharge command PRE specifying the bank [0] is issued in "T=13."

Consequently, data read according to the first READ specifying the bank [0] is supplied in "T=5 to T=8," and data read according to the second READ specifying the bank [0] is supplied in "T=9 to T=12." Further, data read according to the third READ specifying the bank [0] is supplied in "T=13 to T=16." Data read according to READ specifying the bank [1] is supplied in "T=17 to T=20."

FIG. 17C schematically shows a case where the command generating section 350 makes a command collision avoidance determination that prioritizes the precharge command PRE in "T=0." Suppose in this case that a setting for prioritizing the issuance of a precharge command PRE over the issuance of READ and WRITE is made in the command generating section 350. Further, suppose that a setting for prioritizing the issuance of ACT over the issuance of READ and WRITE is made in the command generating section 350.

Of the first READ specifying the bank [0] and the precharge command PRE specifying the bank [1] which commands collide with each other, the command generating section 350 preferentially issues the precharge command PRE in timing corresponding to "T=0." Thereby, the precharge command PRE specifying the bank [1] is issued in "T=0." Then, in "T=1," the first READ specifying the bank [0] is issued.

Thereafter, a command collision occurs between ACT specifying the bank [1] and the second READ specifying the bank [0] in "T=5." The command generating section 350 preferentially issues ACT specifying the bank [1] in timing corresponding to "T=5." Thereby, ACT specifying the bank [1] is issued in "T=5." Then, in "T=6," the second READ specifying the bank [0] is issued.

Thereafter, READ specifying the bank [0] is generated in "T=10." READ specifying the bank [1] is generated in "T=14." A precharge command PRE specifying the bank [0] is generated in "T=15."

Consequently, data read according to the first READ specifying the bank [0] is supplied in "T=6 to T=9," and data read according to the second READ specifying the bank [0] is supplied in "T=11 to T=14." Further, data read according to the third READ specifying the bank [0] is supplied in "T=15 to T=18," and data read according to READ specifying the bank [1] is supplied in "T=19 to T=22."

Thus, in the first and second embodiments of the present invention, command collision avoidance can be achieved with high efficiency of data transfer when READ is prioritized over the precharge command PRE and ACT in a case of command collision as shown in FIG. 17A. Incidentally, while FIGS. 17A to 17C suppose a case of issuing READ, the same is true for a case of issuing WRITE. Command collision avoidance with high efficiency of data transfer can be achieved when WRITE is prioritized over the precharge command PRE and ACT.

In the first and second embodiments of the present invention, command collision is avoided by using preset command prioritizing order. However, when command collision is to be avoided, efficient command collision avoidance can be achieved by selecting a command to be prioritized according to the state of command collision as shown in FIGS. 16A to 16C and FIGS. 17A to 17C.

A third embodiment in which a command generating section 350 selects which command to prioritize at the time of command collision processing will next be described with reference to drawings.

<3. Third Embodiment>
[Example of Operation of Request Generating Section in Third Embodiment]

Figure 18:
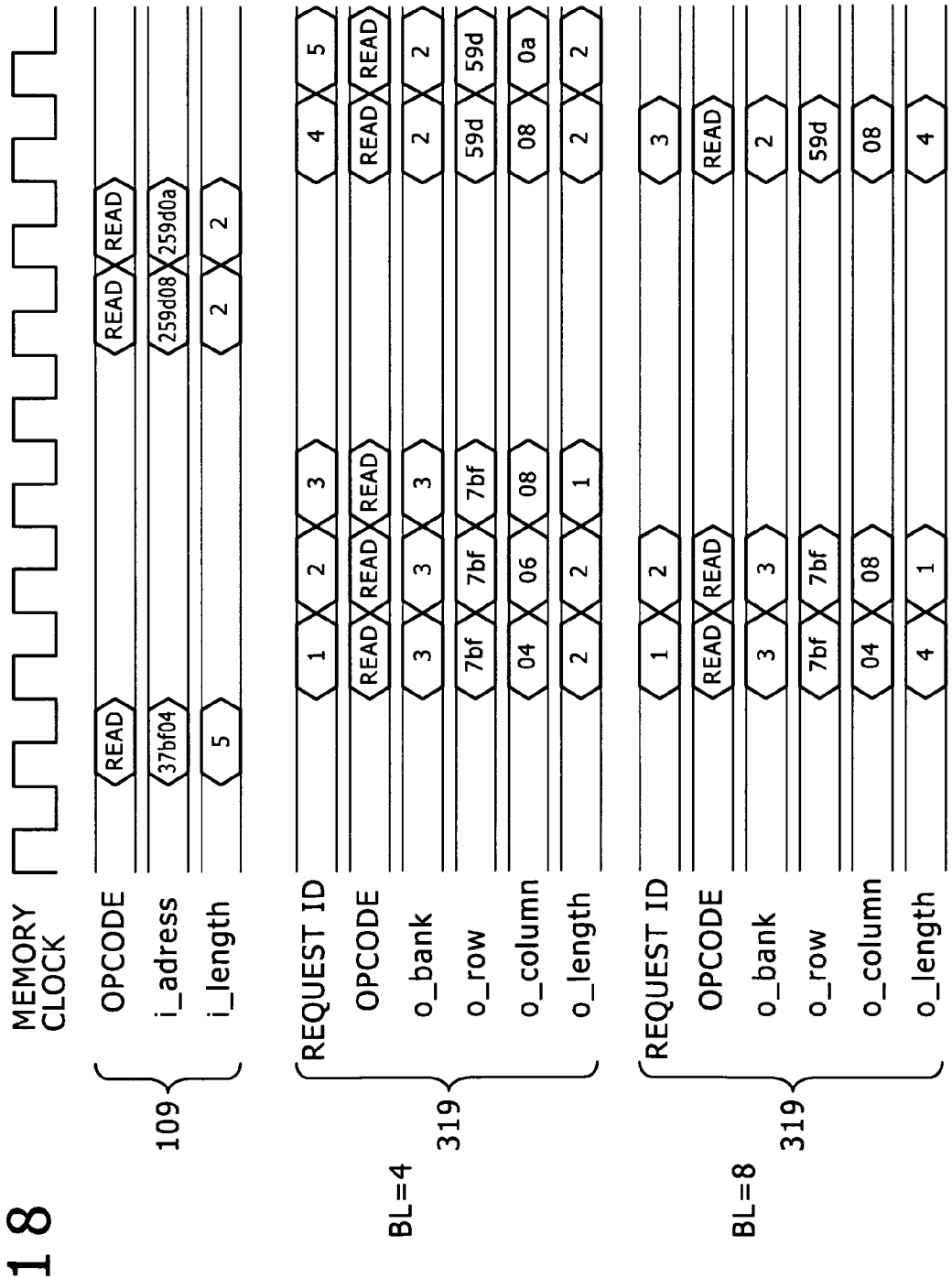
FIG. 18 is a timing chart showing an example of operation of a request generating section in a third embodiment of the present invention.

FIG. 18 is a timing chart showing an example of operation of a request generating section 310 in the third embodiment of the present invention. The request generating section 310 generates a request ID in addition to the signals in the signal line 319 shown in FIG. 3. The signals other than the request ID are the same as in FIG. 3, and therefore description of the signals will be omitted in the following.

When a data access request is input to the request generating section 310 in the third embodiment via a signal line 109, the request generating section 310 generates a memory request including signals of a request ID, an opcode, o_bank, o_row, o_column, and o_length. This request ID is the signal of a number indicating order in which the memory request is generated among memory requests. The request ID is for example a signal represented as a number increasing by "1" at a time in the order of generation of the memory requests.

Thus, the request generating section 310 in the third embodiment of the present invention unites and divides memory requests, and thereby generates memory requests including request IDs in burst length units.

[Example of Command Collision Avoidance Determination in Third Embodiment of the Present Invention]

FIG. 19 is a list showing an example of contents determined to perform command collision avoiding operation by a command generating section 350 in the third embodiment of the present invention. FIG. 19 shows contents of command collision avoiding operation of the command generating section 350 in a left column, and shows conditions for the operation in a right column.

"P" in the column showing the operation conditions denotes a maximum number of READs issuable in a period from PRE issuance to issuance of READ in a same bank. That is, this "P" is a maximum value of a positive integer determined by an expression for "P" shown in parentheses in the operation conditions of FIG. 19.

"A" in the column showing the operation conditions denotes a maximum number of READs issuable in a period from issuance of ACT to issuance of READ and WRITE in a same bank. That is, this "A" is a maximum value of a positive integer determined by an expression for "A" shown in parentheses in the operation conditions of FIG. 19.

The prioritized issuance of PRE of RasReqBnk over READ of CasReqBnk refers to an operation of issuing PRE in the timing thereof and issuing READ later at a time of command collision between READ based on a C-request and PRE of a bank specified by an R-request. The operation condition for the prioritized issuance holds when a difference between the request ID of the R-request and the request ID of the C-request is "P" or less.

The prioritized issuance of READ of CasReqBnk over PRE of RasReqBnk refers to an operation of issuing READ in the timing thereof and issuing PRE later at a time of command collision between PRE of a bank specified by an R-request and READ based on a C-request. The operation condition for the prioritized issuance holds when a difference between the request ID of the R-request and the request ID of the C-request is larger than "P."

The prioritized issuance of ACT of RasReqBnk over READ of CasReqBnk refers to an operation of issuing ACT in the timing thereof and issuing READ later at a time of command collision between READ based on a C-request and ACT of a bank specified by an R-request. The operation condition for the prioritized issuance holds when a difference between the request ID of the R-request and the request ID of the C-request is "A" or less.

The prioritized issuance of READ of CasReqBnk over ACT of RasReqBnk refers to an operation of issuing READ in the timing thereof and issuing ACT later at a time of command collision between ACT of a bank specified by an R-request and READ based on a C-request. The operation condition for the prioritized issuance holds when a difference between the request ID of the R-request and the request ID of the C-request is larger than "A."

[Example of Operation of Command Generating Section when Prioritizing Issuance of PRE]

Figure 20:
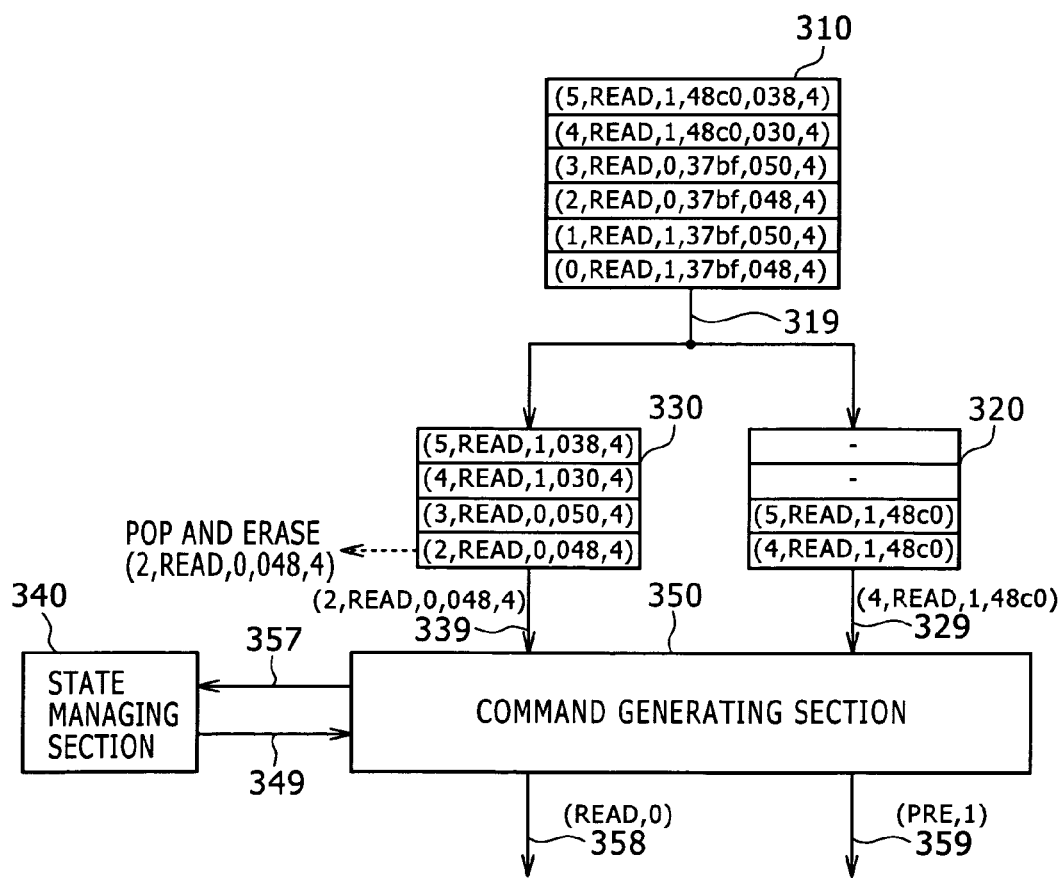
FIG. 20 is a schematic diagram showing operation of the command generating section when determining that the issuance of a precharge command PRE is prioritized in the third embodiment of the present invention.

FIG. 20 is a schematic diagram showing operation of the command generating section 350 when determining that the issuance of a precharge command PRE is prioritized in the third embodiment of the present invention.

Incidentally, for convenience, an operation of extracting (POP) and thereby erasing an R-request and a C-request from the R-request queue 320 and the C-request queue 330 by the command generating section 350 is schematically shown by a broken line separate from signal lines 329 and 339.

Suppose that the request generating section 310 generates the following six memory requests and supplies the generated memory requests to the R-request queue 320 and the C-request queue 330 while maintaining the order of the memory requests. The memory requests shown in this case indicate (a request ID, an opcode, a bank number, a row address, a column address, data length represented as a number of cycles of a memory clock) in the memory requests.

Suppose that the first input memory request is (0, READ, 1, 37bf, 048, 4), that the second input memory request is (1, READ, 1, 37bf, 050, 4), and that the third input memory request is (2, READ, 0, 37bf, 048, 4). Next, suppose that the fourth input memory request is (3, READ, 0, 37bf, 050, 4), that the fifth input memory request is (4, READ, 1, 48c0, 030, 4), and that the sixth input memory request is (5, READ, 1, 48c0, 038, 4).

In addition, suppose that the row selecting information including information of the fifth memory request is an R-request in the R-request queue 320. Suppose that the column selecting information including information of the third memory request is a C-request in the C-request queue 330. Further, suppose that memory bank information retained by a state managing section 340 indicates that PRE is issuable via a signal line 359 for a bank [1] at an issuance time of "0" and that READ is issuable via the signal line 359 for a bank [0] at the issuance time of "0." Incidentally, in this case, suppose that "BL" is "8" and that "tRPD" is "5." In addition, suppose that the performance of the SDRAM 120 other than "tRPD" is similar to that of FIG. 7. That is, "tRCD" is "5," "tRP" is "5," and "BL/2" is "4." Thus, "P" is 2.

The command generating section 350 makes the R-request queue 320 output the R-request, makes the C-request queue 330 output the C-request, and makes the state managing section 340 output the memory bank information. The command generating section 350 then determines the issuable conditions and issuable times of commands. Together with this judgment, the command generating section 350 calculates a difference between the request ID of the R-request and the request ID of the C-request, and compares the calculated difference with "P" and "A."

As a result, the command generating section 350 determines that READ based on the C-request is issuable via the signal line 359 because the issuance time is "0," and that the precharge command PRE is issuable via the signal line 359 for the bank [1] because the issuance time is "0." In addition, the command generating section 350 determines that PRE is issued preferentially when a command collision occurs between READ based on the C-request and PRE specifying the bank [1] because the difference between the request ID of the R-request and the request ID of the C-request is "2." That is, as a result of a determination to avoid command collision at an issuance time "0," the command generating section 350 determines that the precharge command PRE is to be issued at the issuance time "0," and that READ is to be issued at an issuance time "1."

From these determinations, the command generating section 350 generates READ for specifying the column address "048" in the bank [0] and setting the column address "048" in the bank [0] in the read state and the precharge command PRE specifying the bank [1]. Then, the command generating section 350 supplies the precharge command PRE from the signal line 359, and supplies READ from the signal line 358.

[Example of Operation of Command Generating Section when Prioritizing Issuance of READ and WRITE]

Figure 21:
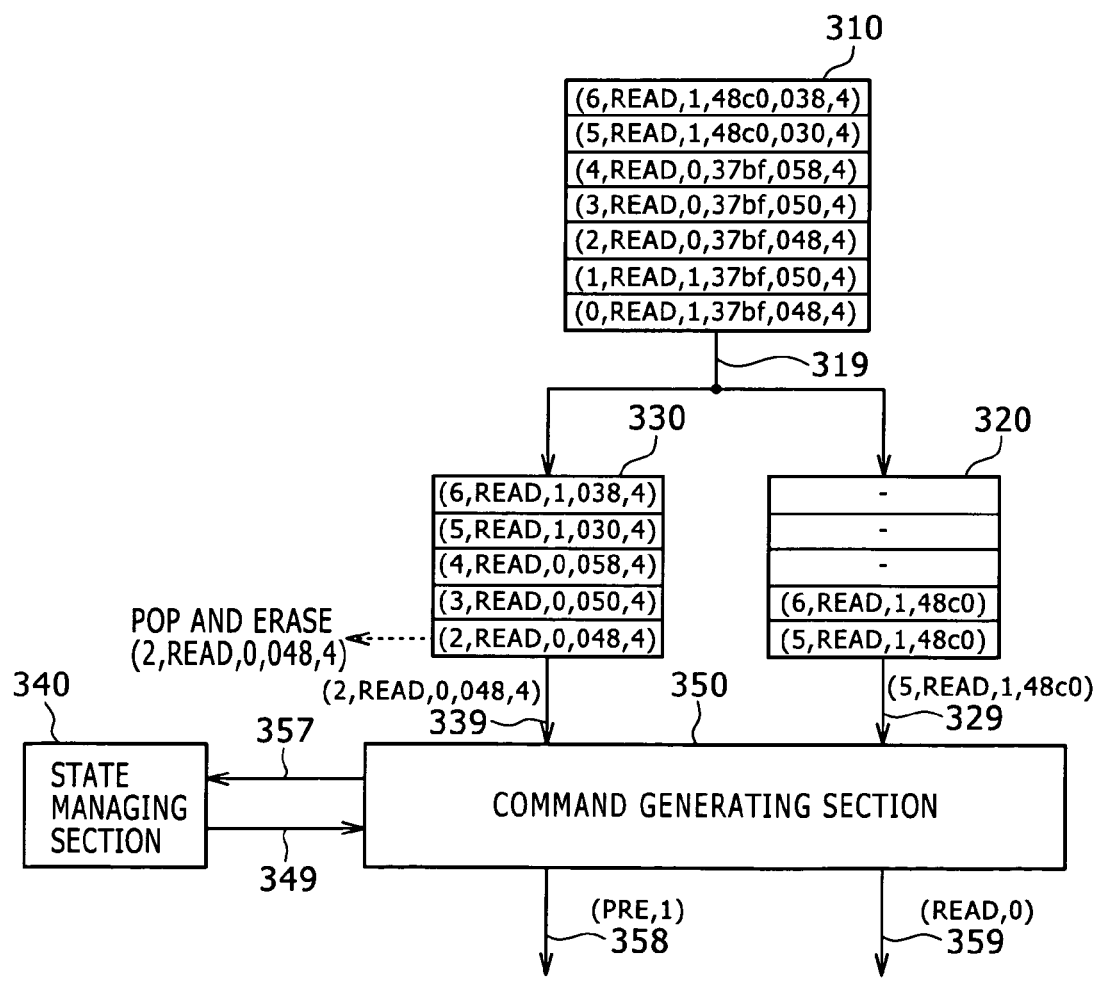
FIG. 21 is a schematic diagram showing operation of the command generating section when determining that the issuance of READ is prioritized in the third embodiment of the present invention.

FIG. 21 is a schematic diagram showing operation of the command generating section 350 when determining that the issuance of READ is prioritized in the third embodiment of the present invention. Incidentally, for convenience, an operation of extracting. (POP) and thereby erasing an R-request and a C-request from the R-request queue 320 and the C-request queue 330 by the command generating section 350 is schematically shown by a broken line separate from the signal lines 329 and 339.

Suppose that the request generating section 310 generates the following seven memory requests and supplies the generated memory requests to the R-request queue 320 and the C-request queue 330 while maintaining the order of the memory requests. The memory requests shown in this case indicate (a request ID, an opcode, a bank number, a row address, a column address, data length represented as a number of cycles of a memory clock) in the memory requests.

Suppose that the first input memory request is (0, READ, 1, 37bf, 048, 4), that the second input memory request is (1, READ, 1, 37bf, 050, 4), and that the third input memory request is (2, READ, 0, 37bf, 048, 4). Next, suppose that the fourth input memory request is (3, READ, 0, 37bf, 050, 4), that the fifth input memory request is (4, READ, 0, 37bf, 058, 4), that the sixth input memory request is (5, READ, 1, 48c0, 030, 4), and that the seventh input memory request is (6, READ, 1, 48c0, 038, 4).

In addition, suppose that the row selecting information including information of the sixth memory request is an R-request in the R-request queue 320. Suppose that the column selecting information including information of the third memory request is a C-request in the C-request queue 330.

Further, suppose that memory bank information retained by a state managing section 340 indicates that PRE is issuable via a signal line 359 for a bank [1] at an issuance time of "0" and that READ is issuable via the signal line 359 for a bank [0] at the issuance time of "0." Incidentally, in this case, suppose that "BL" is "8" and that "tRPD" is "5." In addition, suppose that the performance of the SDRAM 120 other than "tRPD" is similar to that of FIG. 7. That is, "tRCD" is "5," "tRP" is "5," and "BL/2" is "4." Thus, "P" is 2.

The command generating section 350 makes the R-request queue 320 output the R-request, makes the C-request queue 330 output the C-request, and makes the state managing section 340 output the memory bank information. The command generating section 350 then determines the issuable conditions and issuable times of commands. Further, together with this determination, the command generating section 350 calculates a difference between the request ID of the R-request and the request ID of the C-request, and compares the calculated difference with "P" and "A."

As a result, the command generating section 350 determines that READ based on the C-request is issuable via the signal line 359 because the issuance time is "0," and that the precharge command PRE is issuable via the signal line 359 for the bank [1] because the issuance time is "0." In addition, the command generating section 350 determines that READ is issued preferentially when a command collision occurs between READ based on the C-request and PRE specifying the bank [1] because the difference between the request ID of the R-request and the request ID of the C-request is "3." That is, as a result of a determination to avoid command collision at an issuance time "0," the command generating section 350 determines that READ is to be issued at the issuance time "0," and that the precharge command PRE is to be issued at an issuance time "1."

From these determinations, the command generating section 350 generates READ for specifying the column address "048" in the bank [0] and setting the column address "048" in the bank [0] in the read state and the precharge command PRE specifying the bank [1]. Then, the command generating section 350 supplies READ from the signal line 359, and supplies the precharge command PRE from the signal line 358.

Thus, according to the third embodiment of the present invention, command collision can be avoided without a decrease in data transfer efficiency by determining command prioritizing order when avoiding command collision using request IDs.

Thus, according to embodiments of the present invention, the operation of the SDRAM 120 can be designated by generating N commands by the command generating section 350 operating at 1/N of the frequency of the memory clock. That is, according to embodiments of the present invention, a plurality of commands can be generated efficiently by operation at a frequency lower than that of the memory clock. It is thereby possible to decrease power consumption and reduce high-frequency noise in the memory controller.

Incidentally, the foregoing embodiments suppose the R-request queue 320 that retains an opcode, a bank number, and a row address as row selecting information and the C-request queue 330 that retains an opcode, a bank number, a column address, and data length as column selecting information. However, the data retained by the R-request queue 320 and the C-request queue 330 represents an example, and the present invention is not limited to this. For example, the R-request queue 320 and the C-request queue 330 may retain all the information of memory requests, and all the information of the memory requests may be input to the command generating section 350 as R-requests and C-requests. Thus, for example, a device generating a plurality of commands using opcodes, bank numbers, row addresses, and data length of the R-requests and the C-requests is conceivable as the command generating section 350.

It is to be noted that embodiments of the present invention represent an example for embodying the present invention, and each have correspondences with specific inventive items in claims as described above. However, the present invention is not limited to embodiments, and is susceptible of various modifications without departing from the spirit of the present invention.

In addition, the process steps described in embodiments of the present invention may be perceived as a method having the series of steps, or may be perceived as a program for making a computer perform the series of steps or a recording medium storing the program. As the recording medium, for example, a CD (Compact Disc), an MD (MiniDisc), a DVD (Digital Versatile Disk), a memory card, a Blu-ray Disc (registered trademark) or the like can be used.

The present application contains subject matter related to that disclosed in Japanese Priority Patent Application JP 2009-078275 filed in the Japan Patent Office on Mar. 27, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A memory controlling device comprising:
   a request generating section configured to generate memory requests from a data access request to a memory controlled in each of memory banks;
   a row selecting information retaining section configured to retain a plurality of opcodes, memory bank numbers specifying said memory banks, and row addresses specifying row addresses in said memory banks in said memory requests as row selecting information while maintaining input order of said memory requests;
   a column selecting information retaining section configured to separately retain a plurality of said opcodes, said memory bank numbers, column addresses specifying column addresses in said memory banks, and data lengths of data to be accessed according to said memory requests in said memory requests as column selecting information while maintaining the input order of said memory requests;
   a memory bank information managing section configured to manage a state of operation of said memory as memory bank information for each of said memory banks;
   a command generating section configured to generate a plurality of commands designating operation related to said memory banks at a frequency lower than frequency of a memory clock of said memory on a basis of said row selecting information, said column selecting information, and said memory bank information; and
   a command aligning section configured to align said plurality of generated commands in synchronism with said memory clock.

2. The memory controlling device according to claim 1, wherein said command generating section generates N (N is an integer of two or more) said commands at 1/N of the frequency of said memory clock.

3. The memory controlling device according to claim 1, wherein said request generating section generates said memory requests in burst length units according to said data length of said data access request.

4. The memory controlling device according to claim 1, wherein when there is a vacancy in both of said row selecting information retaining section and said column selecting information retaining section, said request generating section inputs a new memory request to both of said row selecting information retaining section and said column selecting information retaining section.

5. The memory controlling device according to claim 1, wherein
said row selecting information retaining section is formed by a queue performing first-in first-out operation on said row selecting information, and
said command generating section extracts said row selecting information retained by said row selecting information retaining section from said row selecting information retaining section when said command generating section generates a command specifying one of said row addresses among said commands on a basis of said row selecting information or when said row address specified by said row selecting information coincides with said row address specified as an object for data access in said memory bank.

6. The memory controlling device according to claim 1, wherein
said column selecting information retaining section is formed by a queue performing first-in first-out operation on said column selecting information, and
said command generating section extracts said column selecting information retained by said column selecting information retaining section from said column selecting information retaining section when said command generating section generates a command specifying one of said column addresses among said commands on a basis of said column selecting information.

7. The memory controlling device according to claim 1, further comprising
a waiting information retaining section configured to extract said row selecting information from said row selecting information retaining section and retain said row selecting information as waiting row selecting information when said command generating section waits to generate a command specifying one of said row addresses among said commands, wherein
said command generating section generates said commands on a basis of oldest said row selecting information in the input order, the oldest said row selecting information being retained by said row selecting information retaining section, said waiting row selecting information, said column selecting information, and said memory bank information.

8. The memory controlling device according to claim 1, wherein
said request generating section supplies said memory requests with request identifiers as order of said memory requests,
said row selecting information retaining section further retains one of said request identifiers as said row selecting information,
said column selecting information retaining section further retains one of said request identifiers as said column selecting information, and
said command generating section preferentially generates a command specifying one of said column addresses before another command among said commands when a difference between said request identifier of said row selecting information and said request identifier of said column selecting information is higher than a predetermined value.

9. The memory controlling device according to claim 1, further comprising
a command synchronizing and outputting section configured to output said plurality of commands generated by said command generating section to said command aligning section in synchronized timing while maintaining frequency of said command generating section.

10. A memory controlling device comprising:
an operation designation supplying section configured to supply opcodes, column addresses, and row addresses for generating commands designating operation for a memory;
a row selecting information retaining section configured to retain said row addresses for generating said commands as row selecting information;
a column selecting information retaining section configured to separately retain said opcodes and said column addresses as column selecting information;
a memory information managing section configured to manage memory information retaining a row address in an active state in said memory and timing in which said commands can be generated;
a command generating section configured to generate a plurality of said commands at a frequency lower than frequency of a memory clock of said memory by generating a command to read row data corresponding to said row address from said memory among said commands on a basis of said memory information and said row selecting information and a command to read data corresponding to one of said column addresses from said row data among said commands on a basis of said memory information and said column selecting information; and
a command aligning section configured to align said plurality of generated commands in synchronism with said memory clock.

11. A memory controlling device comprising:
request generating means for generating memory requests from a data access request to a memory controlled in each of memory banks;
row selecting information retaining means for retaining a plurality of opcodes, memory bank numbers specifying said memory banks, and row addresses specifying row addresses in said memory banks in said memory requests as row selecting information while maintaining input order of said memory requests;
column selecting information retaining means for separately retaining a plurality of said opcodes, said memory bank numbers, column addresses specifying column addresses in said memory banks, and data lengths of data to be accessed according to said memory requests in said memory requests as column selecting information while maintaining the input order of said memory requests;
memory bank information managing means for managing a state of operation of said memory as memory bank information for each of said memory banks;
command generating means for generating a plurality of commands designating operation related to said memory banks at a frequency lower than frequency of a memory clock of said memory on a basis of said row selecting information, said column selecting information, and said memory bank information; and command aligning means for aligning said plurality of generated commands in synchronism with said memory clock.

12. A memory controlling device comprising:
operation designation supplying means for supplying opcodes, column addresses, and row addresses for generating commands designating operation for a memory;
row selecting information retaining means for retaining said row addresses for generating said commands as row selecting information;
column selecting information retaining means for separately retaining said opcodes and said column addresses as column selecting information;
memory information managing means for managing memory information retaining a row address in an active state in said memory and timing in which said commands can be generated;
command generating means for generating a plurality of said commands at a frequency lower than frequency of a memory clock of said memory by generating a command to read row data corresponding to said row address from said memory among said commands on a basis of said memory information and said row selecting information and a command to read data corresponding to one of said column addresses from said row data among said commands on a basis of said memory information and said column selecting information; and
command aligning means for aligning said plurality of generated commands in synchronism with said memory clock.

13. The memory controlling device according to claim 10, further comprising
a waiting information retaining section configured to extract said row selecting information from said row selecting information retaining section and retain said row selecting information as waiting row selecting information when said command generating section waits to generate a command specifying one of said row addresses among said commands, wherein
said command generating section generates said commands on a basis of oldest said row selecting information in the input order, the oldest said row selecting information being retained by said row selecting information retaining section, said waiting row selecting information, said column selecting information, and said memory information.

14. The memory controlling device according to claim 10, wherein
said operation designation supplying means supplies memory requests with request identifiers indicating an order of said memory requests,
said row selecting information retaining section further retains one of said request identifiers as said row selecting information,
said column selecting information retaining section further retains one of said request identifiers as said column selecting information, and
said command generating section preferentially generates a command specifying one of said column addresses before another command among said commands when a difference between said request identifier of said row selecting information and said request identifier of said column selecting information is higher than a predetermined value.

15. The memory controlling device according to claim 11, further comprising a waiting information retaining means for extracting said row selecting information from said row selecting information retaining means and retaining said row selecting information as waiting row selecting information when said command generating means waits to generate a command specifying one of said row addresses among said commands, wherein
said command generating means generates said commands on a basis of oldest said row selecting information in the input order, the oldest said row selecting information being retained by said row selecting information retaining means, said waiting row selecting information, said column selecting information, and said memory bank information.

16. The memory controlling device according to claim 11, wherein
said request generating means supplies said memory requests with request identifiers as order of said memory requests,
said row selecting information retaining means further retains one of said request identifiers as said row selecting information,
said column selecting information retaining means further retains one of said request identifiers as said column selecting information, and
said command generating means preferentially generates a command specifying one of said column addresses before another command among said commands when a difference between said request identifier of said row selecting information and said request identifier of said column selecting information is higher than a predetermined value.

17. The memory controlling device according to claim 12, further comprising
a waiting information retaining means for extracting said row selecting information from said row selecting information retaining means and retaining said row selecting information as waiting row selecting information when said command generating means waits to generate a command specifying one of said row addresses among said commands,
wherein said command generating means generates said commands on a basis of oldest said row selecting information in the input order, the oldest said row selecting information being retained by said row selecting information retaining means, said waiting row selecting information, said column selecting information, and said memory information.

18. The memory controlling device according to claim 12, wherein
said operation designation supplying means supplies memory requests with request identifiers indicating an order of said memory requests,
said row selecting information retaining means further retains one of said request identifiers as said row selecting information,
said column selecting information retaining means further retains one of said request identifiers as said column selecting information, and
said command generating means preferentially generates a command specifying one of said column addresses before another command among said commands when a difference between said request identifier of said row selecting information and said request identifier of said column selecting information is higher than a predetermined value.

* * * * *